United States Patent
Takahashi et al.

(10) Patent No.: US 9,695,720 B2
(45) Date of Patent: Jul. 4, 2017

(54) METHOD OF REGENERATING EXHAUST GAS POST-PROCESSING APPARATUS IN ENGINE-DRIVEN GENERATOR, AND REGENERATION APPARATUS

(71) Applicant: Hokuetsu Industries Co., Ltd., Niigata (JP)

(72) Inventors: Shinichiro Takahashi, Niigata (JP); Isao Masuda, Niigata (JP)

(73) Assignee: HOKUETSU INDUSTRIES CO., LTD, Niigata (JP)

( * ) Notice: Subject to any disclaimer, the term of this patent is extended or adjusted under 35 U.S.C. 154(b) by 0 days.

(21) Appl. No.: 14/845,856

(22) Filed: Sep. 4, 2015

(65) Prior Publication Data

US 2016/0153330 A1 Jun. 2, 2016

(30) Foreign Application Priority Data

Dec. 1, 2014 (JP) ................. 2014-243407

(51) Int. Cl.
| | |
|---|---|
| *F01N 3/023* | (2006.01) |
| *F01N 3/035* | (2006.01) |
| *F01N 9/00* | (2006.01) |
| *F01N 3/10* | (2006.01) |
| *F01N 3/021* | (2006.01) |
| *F01N 3/027* | (2006.01) |

(52) U.S. Cl.
CPC ........... *F01N 3/0232* (2013.01); *F01N 3/021* (2013.01); *F01N 3/027* (2013.01); *F01N 3/035* (2013.01); *F01N 3/103* (2013.01); *F01N 9/002* (2013.01); *Y02T 10/47* (2013.01)

(58) Field of Classification Search
CPC ...... F02D 41/029; F01N 9/002; F01N 3/0842; F01N 13/02; F01N 3/035
USPC ................ 60/274, 285, 286, 295, 297, 311
See application file for complete search history.

(56) References Cited

U.S. PATENT DOCUMENTS

2009/0044520 A1\* 2/2009 Farell ..................... F01N 3/023
60/295

FOREIGN PATENT DOCUMENTS

| DE | 4239357 C1 * | 12/1993 | ............ F01N 3/027 |
|---|---|---|---|
| DE | WO 2008119589 A1 * | 10/2008 | ............ B60K 6/48 |
| FR | EP 1319812 A1 * | 6/2003 | ............ B60K 6/105 |
| GB | WO 02101208 A1 * | 12/2002 | ............ F01N 3/027 |
| JP | 8-338229 | * 12/1996 | |

(Continued)

*Primary Examiner* — Patrick Maines
(74) *Attorney, Agent, or Firm* — Cooper Legal Group LLC

(57) ABSTRACT

In a continuous regeneration type exhaust gas post-processing apparatus equipped with an oxidation catalyst (DOC) and a diesel particulate filter (DPF), reliably removing particulate matter (PM) deposited to the DOC for maintaining the activity performance of DOC. The present invention relates to a method of forcibly regenerating a continuous regeneration type exhaust gas post-processing apparatus installed in an engine-driven generator equipped with a generator body driven by a diesel engine. When the engine is in a predetermined light load running state during forced regeneration in which intake gas to the engine is restricted to increase a temperature of exhaust gas, a heater actuated with electricity generated by the generator body switches ON in order to increase a load on the engine and thus a DOC inlet temperature of the exhaust gas post-processing apparatus to a burning temperature of PM deposited in the DOC or more.

20 Claims, 10 Drawing Sheets

(56) References Cited

FOREIGN PATENT DOCUMENTS

| JP | 2001280118 | A | | 10/2001 | |
|---|---|---|---|---|---|
| JP | 2002195024 | A | * | 7/2002 | ............... B60K 6/46 |
| JP | 2007112331 | A | * | 5/2007 | |
| JP | 2007187029 | A | * | 7/2007 | |
| JP | 2009216075 | A | * | 9/2009 | |
| JP | 4574395 | B2 | * | 11/2010 | |
| JP | 2011132836 | A | * | 7/2011 | |
| JP | 2013223267 | A | * | 10/2013 | |
| WO | 2016035164 | | | 3/2016 | |

* cited by examiner

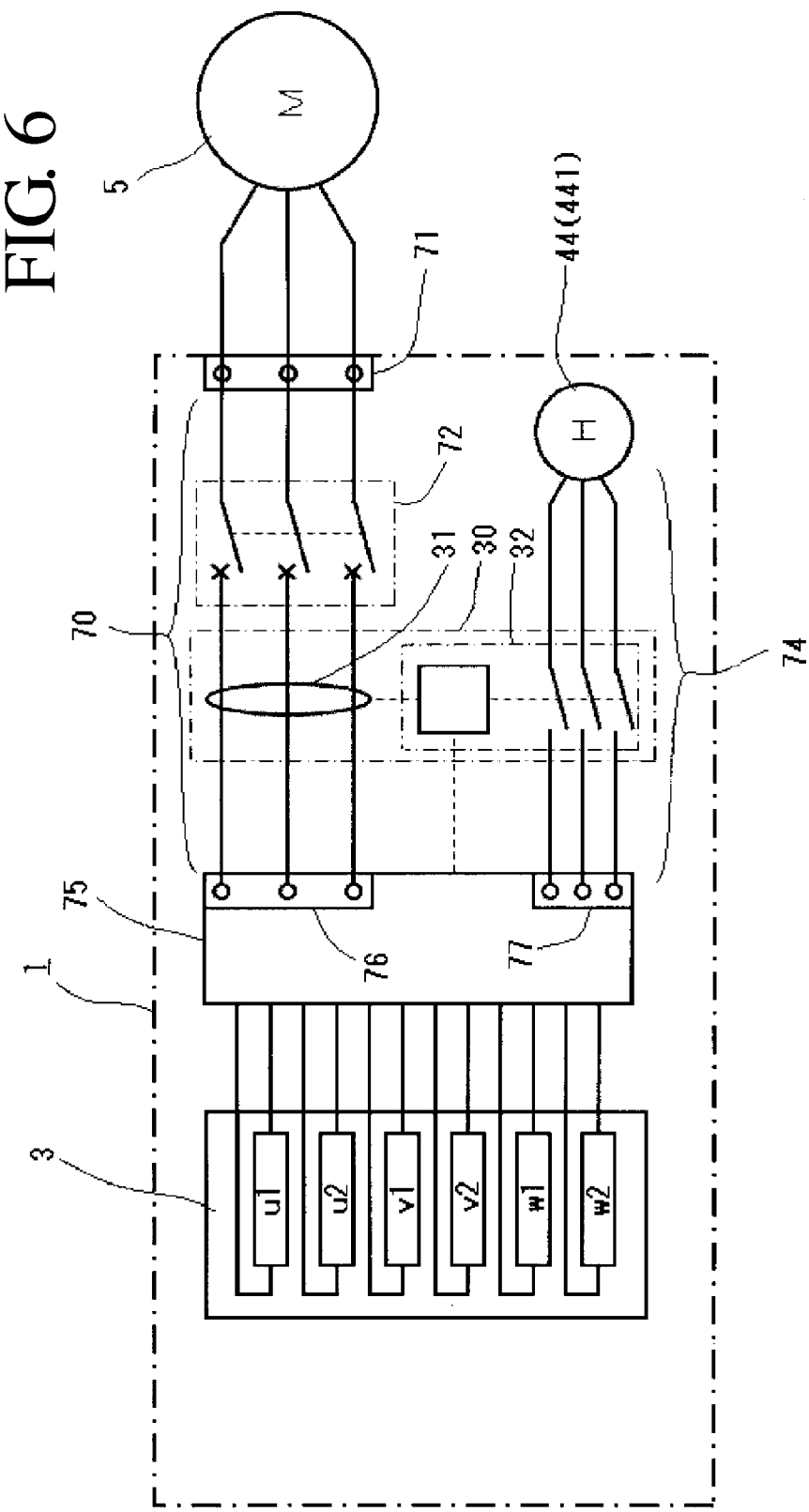

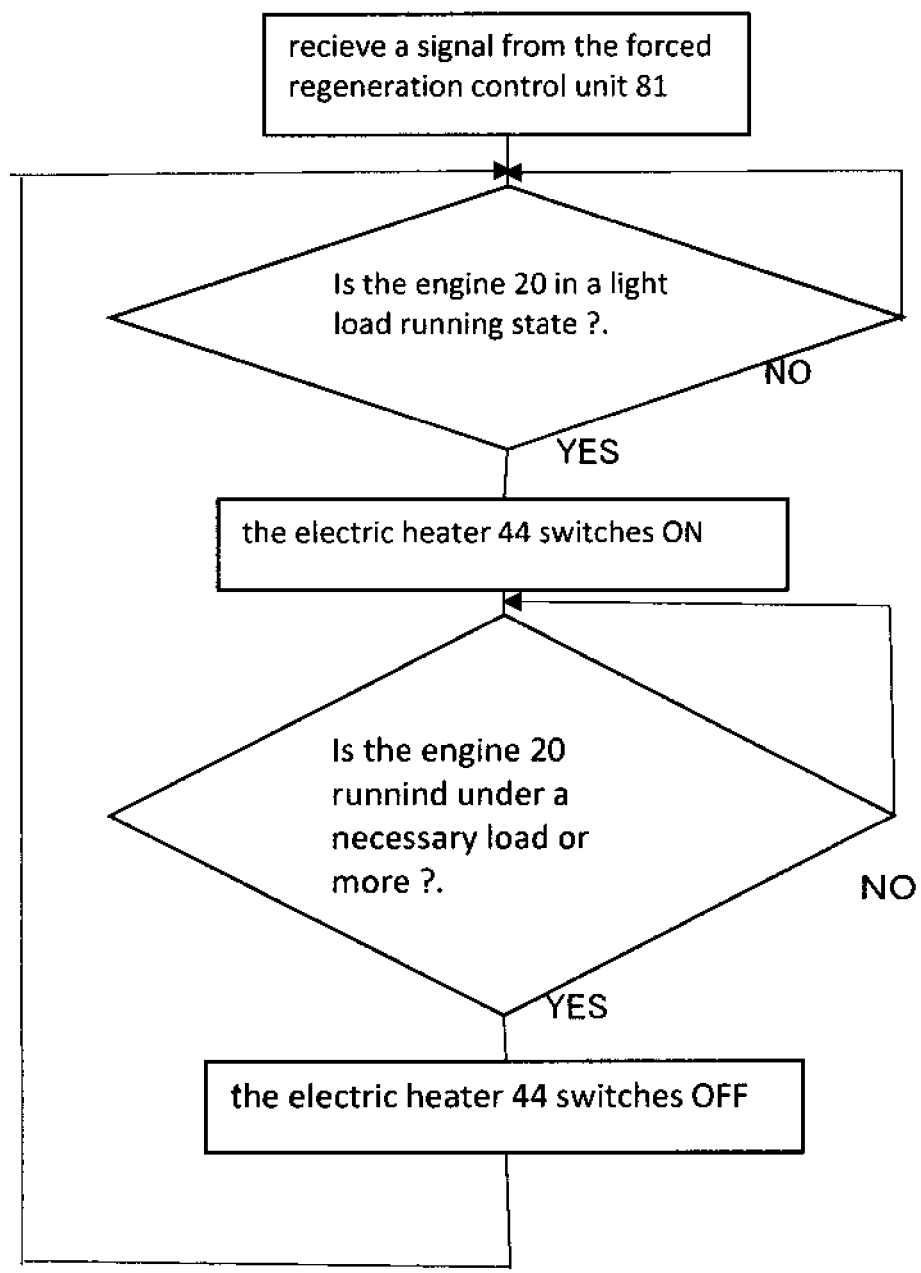

METHOD OF REGENERATING EXHAUST GAS POST-PROCESSING APPARATUS IN ENGINE-DRIVEN GENERATOR, AND REGENERATION APPARATUS

BACKGROUND OF THE INVENTION

1. Field of the Invention

The present invention relates to a method of regenerating an exhaust gas post-processing apparatus that is provided in an exhaust gas path of a diesel engine installed in an engine-driven generator and that removes particulate matter (hereinafter referred to as "PM") from the exhaust gas, and a regeneration apparatus for such an exhaust gas post-processing apparatus.

2. Description of the Related Art

Engine-driven generators that comprise a generator body and an engine for driving this generator body have been used to secure power supply in outdoor workplaces such as civil engineering and construction sites and outdoor event sites, where no commercial power supply can be secured, and have also been used as emergency power supplies for power outages or disasters.

In such engine-driven generators, a diesel engine is typically used as an engine for driving the generator body. However, because of their structure, diesel engines emit a larger amount of PM together with exhaust gas upon combustion, as compared with gasoline engines.

Since PM causes air pollution and health hazards, regulation values (mass per unit output [g/kWh]) for PM emitted from a diesel engine are determined by emission gas regulation.

To adapt to this emission regulation, gas post-processing apparatuses with a diesel particulate filter (hereinafter referred to as a "DPF") are installed in exhaust gas paths of diesel engines in order to reduce the emission amount of PM.

In this exhaust gas post-processing apparatus, the built-in DPF collects PM in exhaust gas in order to reduce the emission amount of PM. Therefore, with continuous use, the deposition of PM with respect to the DPF proceeds and eventually clogs the DPF.

Increase in the resistance for the exhaust gas due to the clogging of the DPF results in lowering the engine output and deteriorating fuel efficiency. Thus, it requires a process to regenerate the DPF by removing PM deposited in the filter medium.

As an exemplary scheme for regenerating a DPF, an exhaust gas post-processing apparatus called as a "continuous regeneration type" exhaust gas post-processing apparatus has been suggested, in which a diesel oxidation catalyst (hereinafter referred to as a "DOC") is provided on its inlet side and a DPF is accommodated on the downstream side so that the DPF is continuously regenerated due to the catalyst effect of the DOC.

This continuous regeneration type exhaust gas post-processing apparatus is for continuously burning and removing PM by means of the heat of the exhaust gas while the engine is running, in which apparatus $NO_2$ is generated by the action of DOC when heated to its activating temperature or more by the exhaust gas from the operating engine, and the $NO_2$ can be used as an oxidizer in burning of PM deposited with respect to the DPF so as to regenerate the DPF at a temperature lower than that at which the PM burns by itself with oxygen.

However, even in the above continuous regeneration type exhaust gas post-processing apparatus, when the engine runs for a long time with the temperature of the exhaust gas below the activating temperature of DOC, such as when the engine runs under a light load for a long time, $NO_2$ is not generated and the PM cannot be burnt. Consequently, the deposition of PM with respect to the DPF proceeds.

Once the engine transits to heavy-load operation after PM is deposited with respect to the DPF beyond a certain amount and the resistance for the exhaust gas is thus elevated, the elevated resistance for the exhaust gas increases the temperature of the exhaust gas to higher than that in normal heavy load operation. As a result, a large amount of PM deposited in the DPF starts to burn by themselves so as to emit high heat, which causes cracks or melts in the DPF.

Therefore, a forced regeneration scheme is also used in combination with the continuous regeneration type exhaust gas post-processing apparatus, in which scheme, when the deposition amount of PM with respect to DPF becomes or exceeds a predetermined amount, a temperature of the exhaust gas is increased by additionally injecting fuel or delaying the injection timing and thus a temperature of the DOC in the exhaust gas post-processing apparatus is increased, so that PM deposited in DPF is forcibly burnt with $NO_2$ as an oxidizer (Japanese Patent LOPI No. 2001-280118).

The followings should be noted. In the forced regeneration scheme according to the above-mentioned Japanese Patent LOPI No. 2001-280118, the forced regeneration is performed in a state such as a running state of an automobile in which a load placed on the engine varies (hereinafter referred to as a "variable load type forced regeneration"). If this variable load type forced regeneration starts when the engine runs under a light load and the exhaust gas has a low temperature, it may take a long time to completely regenerate the DPF. In addition, when a load on the engine varies, the amount of fuel to be additionally injected is fluctuated, or when the engine temporarily runs under a heavy load, additional injection of the fuel is repeatedly stopped, as a result, a temperature of the oxidation catalyst becomes unstable and cannot be kept in its activating temperature or more, thus failing to continuously and stably generate $NO_2$ and completely burn the PM. Moreover, if an operator stops the engine in the course of the execution of the forced regeneration, regenerating the DPF is suspended. In this case, the PM deposited in the DPF may be removed insufficiently and the deposition of PM may further proceed. Then, if the large amount of the deposited PM burns intensely by itself, the DPF body and the filter medium might be damaged. In light of these risks, the applicant of the present application filed a patent application (PCT/JP2014/073178) regarding a method of regenerating an exhaust gas post-processing apparatus installed in an engine-driven compressor. In this method, an operator starts forced regeneration by operating a switch or the like on the basis of, for example lighting of a warning lamp which indicates that at least a predetermined amount of PM is deposited with respect to a DPF so that the forced regeneration can be performed while a constant load is placed on the engine, namely, the temperature of the DPF is kept stable (hereinafter, this type of forced regeneration is referred to as a "constant load type forced regeneration").

The above-described exhaust gas post-processing technology has been developed primarily for diesel engines in automobiles. However, PM emission restrictions should also be imposed on engine-driven generators and other industrial machines equipped with a diesel engine. In present, requests for providing environmentally friendly products are setting up demands for equipping even engine-driven generators with an exhaust gas post-processing apparatus.

However, when the above-described continuous regeneration type exhaust gas post-processing apparatus is installed in an engine-driven generator without any modification, the activity performance of the DOC deteriorates at a relatively early stage. This may inhibit PM deposited in the DPF from being burned and removed sufficiently during forced regeneration. This problem has not been found when a continuous regeneration type exhaust gas post-processing apparatus is installed in an automobile.

Suppose that the activity performance of the DOC deteriorates and PM deposited in the DPF cannot be removed completely in the forced regeneration and some PM is left therein, the DPF may be clogged at shorter time intervals, accordingly, fuel should be additionally injected more frequently. As a result, the fuel efficiency might deteriorate and a larger amount of unburned fuel is generated as a larger amount of the fuel is injected. Consequently, an oil dilution phenomenon, i.e., mixing the engine oil with the unburned fuel, is likely to occur, thus the engine oil is prone to deteriorate at an earlier stage and damage the engine accordingly.

An investigation of the cause of the deterioration at an earlier stage of the activity performance of the DOC in an exhaust gas post-processing apparatus installed in an engine-driven generator revealed that PM was deposited with respect to not only the DPF but the DOC in the exhaust gas post-processing apparatus installed in an engine-driven generator.

Another investigation of the cause of deposition of PM with respect to the DOC concluded that the use mode of a diesel engine in an engine-driven generator is different from that of a diesel engine in an automobile so that a lower-limit temperature of the exhaust gas was lower in the engine in the engine-driven generator compared with the diesel engine in an automobile.

More specifically, a heavier load on an engine makes the burning temperature inside the combustion chamber and the temperature of the exhaust gas higher, while a lighter load on the engine makes both the temperatures lower. When the driver stops an automobile over a long time or parks it, he/she stops its engine. Thus, the engine rarely runs under no load (idling operation) over a long time. In contrast, even when the engine runs under a light load, such as when the automobile runs at a low speed, a certain load is placed on the automobile, because the engine is rotating wheels which bear the weight of the automobile, in which case the exhaust gas is maintained at some high temperatures.

While an engine-driven generator is consuming no electricity, such as while an electrical device connected thereto is stopping its operation, an engine-driven generator may be still operating at idle without stopping its operation and ready for a following startup of the electrical device. As long as at least an electrical device is connected to an engine-driven generator, the engine-driven generator may continuously operate without stopping the engine even if this electrical device consumes relatively low electricity. In short, an engine-driven generator may continuously operate over a relatively long time while consuming no or little electricity.

The torque required to rotate a generator body increases along with its output power, and when no power is output, almost no load is placed on the engine. Thus, an engine in an engine-driven generator may operate at a lighter load than an engine in an automobile. In other words, the engine in the engine-driven generator may create exhaust gas whose typical temperature is lower than that from the engine in the automobile.

To burn PM deposited in a DOC, it is necessary to increase a typical temperature inside an area in the vicinity of the DOC inlet to preferably about 350° C. or more, more preferably 400° C. or more, although this temperature is dependent on the performance and the like of the DOC.

The DOC inlet temperature in the engine-driven generator which had a deteriorated activity performance was measured. According to this result, the measured temperature did not reach that required to burn PM during both a normal operation in which no fuel is additionally injected and forced regeneration in which the fuel is additionally injected to increase the temperature of exhaust gas. This result thus reveals that the DOC inlet temperature in the engine-driven generator does not have a sufficiently high temperature as long as the generator generates low electricity, namely, operates under a light load.

It is confirmed that an exhaust gas post-processing apparatus in an engine-driven generator, when increasing the temperature of the exhaust gas by additionally injecting fuel, fails to remove PM deposited in the DOC before regenerating the DPF. Moreover, it was observed that when the additional injection of the fuel increases the amount of unburned fuel in the exhaust gas, the unburned fuel adheres to the PM deposited in the DOC and the deposition of PM is further promoted, which is a vicious cycle.

As a result, the activity performance of the DOC deteriorates and thus PM deposited in the DPF also cannot be removed, which is a more vicious cycle.

To overcome the above problem, that is, to break the above vicious cycle, the inventor of the present invention conceived of a novel regeneration method that involves two processes. More specifically, in the first process, the temperature of exhaust gas is increased without an additional injection of fuel to burn and remove PM deposited in a DOC for regenerating the DOC. Then, in the second process, the fuel is additionally injected for regenerating a DPF.

To increase the temperature of the exhaust gas without additionally injecting the fuel upon the regeneration of the DOC, the inventor attempted to restrict intake gas to an engine.

According to Table 1 and FIG. 5, however, when an engine runs under a light load, simply restricting the intake gas may fail to increase the DOC inlet temperature to a temperature at which PM deposited in the DOC burns (350° C. or more, more preferably 400° C. or more). This result teaches that another approach is needed in order to accomplish a novel challenge of regenerating a DOC.

TABLE 1

ELECTRICITY OF GENERATOR BODY
VS DOC INLET TEMPERATURE

| GENERATED ELECTRICITY (kW) | DOC INLET TEMPERATURE (° C.) | |
| --- | --- | --- |
| | INTAKE GAS RESTRICTED | IN NORMAL OPERATION |
| 4 | 260 | 161 |
| 6 | 288 | 179 |
| 8 | 322 | 200 |
| 10 | 377 | 238 |
| 12 | 406 | 254 |

The present invention has been made to solve the above-described problems that has newly arisen when a continuous regeneration type exhaust gas post-processing apparatus equipped with a DOC is installed not in an automobile but in an engine-driven generator. An object of the present invention is to provide a method of regenerating an exhaust gas post-processing apparatus in an engine-driven generator in which the method allows during the forced regeneration to ensure the removal of PM deposited in the DOC provided in the exhaust gas post-processing apparatus with a relatively simple method and apparatus configuration, thereby surely removing PM deposited in the DPF and regenerating the DPF, accordingly, the method can prevent too frequent regeneration due to poor regeneration of the DPF, as well as accompanying fuel efficiency deterioration, oil dilution, and the like. Furthermore, an object of the present invention is also to provide a regeneration apparatus for performing the method.

SUMMARY OF THE INVENTION

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above described objective, a method of regenerating an exhaust gas post-processing apparatus in an engine-driven generator 1, the engine-driven generator 1 comprising an engine 20 that is a diesel engine, a generator body 3 driven by the engine 20, and an output terminal block 71 connected to the generator body 3 via a main supply circuit 70, and configured to be able to supply electricity generated by the generator body 3 to an electrical device 5 connected to the output terminal block 71, the method comprising:

providing a continuous regeneration type exhaust gas post-processing apparatus 7 that is installed in an exhaust gas path of the engine 20 and comprises an oxidation catalyst (DOC) and a diesel particulate filter (DPF);

performing forced regeneration of the exhaust gas post-processing apparatus by restricting intake gas to the engine 20 to increase a temperature of exhaust gas from the engine 20 when the deposition amount of particulate matter (PM) with respect to the diesel particulate filter becomes a predetermined deposition amount;

providing an electric heater 44 actuated with the electricity generated by the generator body 3;

determining electricity to be generated by the generator body 3, in which an oxidation catalyst inlet temperature becomes a burning temperature of the PM deposited with respect to the DOC or more during running of the engine 20 with the intake gas restricted as minimum generated electricity in advance, and setting electricity consumed by the electric heater 44 to the minimum generated electricity or more; and monitoring the running state of the engine 20 while the forced regeneration is being performed, and switching ON the electric heater 44 when the engine 20 is in a predetermined light load running state and switching OFF the electric heater 44 actuated with the electricity generated by the generator body, when the engine 20 is under a predetermined necessary load or more.

In the forced regeneration, fuel may be additionally injected to the engine 20 after a predetermined time elapses from a start of the forced regeneration until the completion of the forced regeneration.

As used herein, the term "additional injection of fuel" encompasses any kinds of additional fuel injection which is performed after a main fuel injection and is effective in increasing a temperature of exhaust gas. Furthermore, the term encompasses a subsequent-injection, a post-injection, and an after-injection (JIS D 0116-5: 2008) for which a time interval without any injection is definitely set after a main injection, as well as any other fuel injection performed successively to a main injection.

In the forced regeneration, a circuit breaker 72 for opening or closing the main supply circuit 70 may be provided then the forced regeneration may be performed with the circuit breaker 72 closed (with allowing to supply electricity to the output terminal block 71), or, with the circuit breaker 72 opened (with the supply of the electricity to the output terminal block 71 interrupted).

Furthermore, a circuit breaker 72 for opening or closing the main supply circuit 70 may be provided, then the forced regeneration may be performed with the circuit breaker 72 closed (with allowing to supply electricity to the output terminal block 71) when the deposition amount of PM with respect to the DPF becomes a predetermined first deposition amount, and the forced regeneration may be performed with the circuit breaker 72 opened (with the supply of the electricity to the output terminal block 71 interrupted) when the deposition amount of PM with respect to the DPF becomes a predetermined second deposition amount that exceeds the first deposition amount.

The monitoring of the running state of the engine 20 is based on one of or a combination of two or more of a fuel injection amount signal to be output from an engine control unit (ECU), a temperature of the exhaust gas from the engine 20, a temperature inside the exhaust gas post-processing apparatus, and a current value flowing through the main supply circuit 70.

Preferably, the electric heater 44 is switched ON when the engine 20 keeps the light load running state over a predetermined time period, and preferably, the electric heater 44 is switched OFF immediately after a load placed on the engine 20 becomes or exceeds the necessary load.

Furthermore, a regeneration apparatus for an exhaust gas post-processing apparatus in an engine-driven generator 1, the engine-driven generator 1 comprising an engine 20 that is a diesel engine, a generator body 3 driven by the engine 20, and an output terminal block 71 connected to the generator body 3 via a main supply circuit 70, and configured to be able to supply electricity generated by the generator body 3 to an electrical device 5 connected to the output terminal block 71 is characterized in that, the regeneration apparatus comprises:

a continuous regeneration type exhaust gas post-processing apparatus 7 that is installed in an exhaust gas path of the engine 20 and comprises an oxidation catalyst (DOC) and a diesel particulate filter;

forced regeneration control unit 81, which determines the deposition amount of the particulate matter of the diesel particulate filter based on the pressure difference between the inlet and the outlet of the diesel particulate filter detected by pressure sensors, outputs a control signal to an electronically controlled intake gas restricting valve provided in the intake gas system of the engine to restrict intake gas to the engine when the deposition amount of particulate matter with respect to the diesel particulate filter becomes a predetermined deposition amount, and performs forced regeneration of the exhaust gas post-processing apparatus by increasing a temperature of exhaust gas from the engine 20 as a result of the restricting intake gas;

an electric heater 44 actuated with the electricity generated by the generator body 3, wherein electricity to be generated by the generator body 3, in which an oxidation catalyst inlet temperature becomes a burning temperature of the PM deposited with respect to the DOC or more during operation of the engine 20 with the intake gas restricted, is determined in advance as minimum generated electricity, and electricity consumed by the electric heater 44 is set to the minimum generated electricity or more, and a heater controller for monitoring the running state of the engine 20 while the forced regeneration control unit 81 is performing the forced regeneration, and switching ON the electric heater 44 when the engine 20 is in a predetermined light load running state and switching OFF the electric heater 44 when the engine 20 is under a predetermined necessary load or more.

The forced regeneration control unit 81 may commands additional fuel injection after a predetermined time (as an example, 10 minutes) elapses from a start of the forced regeneration until the completion of the forced regeneration.

Furthermore, a circuit breaker 72 for opening or closing the main supply circuit 70 may be provided and the forced regeneration control unit 81 may perform the forced regeneration with the circuit breaker 72 dosed (with allowing to supply electricity to the output terminal block 71), or with the circuit breaker 72 opened (with the supply of the electricity to the output terminal block 71 interrupted).

In this case, the forced regeneration control unit 81 performs:

the forced regeneration with the circuit breaker 72 closed (with allowing to supply electricity to the output terminal block 71) when the deposition amount of PM with respect to the DPF becomes a predetermined first deposition amount; and the forced regeneration with the circuit breaker 72 opened (with the supply of the electricity to the output terminal block 71 interrupted) when the deposition amount of PM with respect to the DPF becomes a predetermined second deposition amount that exceeds the first deposition amount.

The heater controller 30 may comprise:

switching device 32 which operates to open or close a heater power supply circuit that connects the generator body 3 to the electric heater 44.

The heater controller 30 may monitor the running state of the engine based on one of or a combination of two or more of: a fuel injection amount signal from an engine control unit (ECU) for the engine 20; a temperature of exhaust gas from the engine 20 or a temperature inside the exhaust gas post-processing apparatus; and a secondary current of a current transformer 31 mounted in the main supply circuit 70.

In this case, the switching device 32 may comprise a controller 32a for determining a load on the engine 20 on the basis of the one or more of the fuel injection amount signal, the temperature of exhaust gas or the temperature inside the exhaust gas post-processing apparatus, and the secondary current of a current transformer and controlling open or close operation.

The heater controller 30 may switch ON the electric heater 44 when the engine 20 keeps the light load running state over a predetermined time period, or the heater controller 30 may switch OFF the electric heater 44 immediately after a load placed on the engine 20 becomes or exceeds the necessary load.

In regenerating an exhaust gas post-processing apparatus 7 installed in an engine-driven generator 1 by means of a regeneration apparatus according to the present invention based on the above-described configuration of the present invention, the following remarkable effects could be obtained.

During the running of an engine 20 with intake gas restricted, electricity to be generated by a generator body 3, in which a DOC inlet temperature becomes a burning temperature of PM deposited in the DOC or more, is determined in advance as minimum generated electricity. Then, an electric heater 44 that consumes electricity equal to or more than this minimum generated electricity is provided. While forced regeneration control unit 81 is performing forced regeneration for the exhaust gas post-processing apparatus 7 with the intake gas to the engine 20 restricted, when the engine 20 is in a predetermined light load running state, the forced regeneration control unit 81 switches ON the electric heater 44. In response to this switching-ON, the generator body 3 generates a larger amount of electricity that corresponds to the electricity consumed by the electric heater 44, making a load on the engine 20 heavier. Consequently, the DOC inlet temperature in the exhaust gas post-processing apparatus 7 is reliably increased without any additional fuel injections to equal to or more than a temperature at which PM deposited in the DOC burns.

In a case where the electric heater 44 heats the cooling water for the engine 20, the cooling water heated by the electric heater 44 warms up the engine 20, thus facilitating an increase in the temperature of the exhaust gas from the engine 20.

As described above, by increasing the DOC inlet temperature to equal to or more than a burning temperature of PM deposited in the DOC without any additional fuel injections which may cause PM to be further deposited, the activity performance of the DOC can recover to or close to its original condition. Consequently, poor regeneration of the DPF during the forced regeneration can be prevented, and furthermore, occurrence of too frequent regeneration, fuel efficiency deterioration, oil dilution, and the like due to clogging of the DPF at an early state can be preferably prevented.

The forced regeneration may be performed only by restriction in intake gas to the engine 20 and the control of switching-ON/OFF of the electric heater 44. However, it is more preferable as described above that, in addition to restricting the intake gas to the engine 20 and controlling switching-ON/OFF of the electric heater, the fuel is additionally injected to the engine 20 after a predetermined time elapses from the start of the forced regeneration until the completion of the forced regeneration. With this configuration, first, controlling the intake gas to the engine 20 and controlling the temperature of the exhaust gas by switching-ON or OFF the electric heater 44 allow the PM deposited in the DOC to be removed without any additional fuel injections which may cause PM to be further deposited with respect to the DOC, so that the activity performance of the DOC is thus recovered. Then, the additional fuel injection effective in removing PM deposited in the DPF is performed so as to carry out regeneration of the DOC and subsequent regeneration of the DPF efficiently.

When a circuit breaker 72 is provided in a main supply circuit 70 and forced regeneration is performed with keeping the circuit breaker 72 closed in order to supply electricity to the output terminal block 71, the variable load type forced regeneration described as prior art filed by the applicant of this application in which forced regeneration can be performed with supplying electricity to the electrical device 5 can be performed easily.

When the forced regeneration is performed with the circuit breaker 72 opened, namely, with the supply of the electricity to the output terminal block 71 interrupted, the constant load type forced regeneration described as prior art filed by the applicant of this application in which forced regeneration can be performed with stable temperature of the exhaust gas by performing the forced regeneration at a constant load that corresponds to the electricity consumed by the electric heater 44 can be performed easily.

It should be noted that, in the configuration in which the forced regeneration with the circuit breaker 72 closed and the forced regeneration with the circuit breaker 72 opened are performed for each stages in accordance with the amount of PM deposited with respect to the DPF (first and second deposition amounts), the exhaust gas post-processing apparatus 7 could be regenerated more reliably.

Heater controller 30 for controlling the switching-ON/OFF of the electric heater 44 can be embodied with a relatively simple configuration including: switching device 32 which operates to open or close a heater power supply circuit 74 that connects the generator body 3 to the electric heater 44. By utilizing, as the control signal of the above-described switching device 32, the signal from the members provided in the existing engine-driven generator 1 such as the fuel injection amount signal from an ECU 80, the sensing signal from the temperature sensing means for sensing a temperature of exhaust gas from the engine or a temperature inside the exhaust gas post-processing apparatus, and the like, simplification of the apparatus configuration and reduction of the number of components, and thus cost reduction can be achieved.

In the configuration in which the foregoing heater controller 30 switch ON the electric heater 44 when the engine 20 keeps a light load running state over a predetermined time period, it can be prevented that instantaneous fluctuations in the electricity consumption unnecessarily switch ON or OFF the electric heater 44, which leads to a longer lifetime of constituent apparatuses.

On the other hand, in the case where the timing for switching OFF the heater 44 is delayed, if an electrical device 5 that adapts to the rated output of the engine-driven generator 1 is connected to an output terminal block 71, electricity is excessively consumed by the amount consumed by the electric heater 44. However, the configuration in which the electric heater 44 switches OFF immediately after at least a predetermined necessary load is placed on the engine 20 eliminates a risk that the above problem arises.

BRIEF DESCRIPTION OF THE DRAWINGS

The objects and advantages of the invention will become apparent from the following detailed description of preferred embodiments thereof provided in connection with the accompanying drawings in which:

FIG. 6 is an electric circuit diagram of another engine-driven generator according to the present invention;

FIG. 9 is a flow chart of a switching device of a heater controller.

DETAILED DESCRIPTION OF THE PREFERRED EMBODIMENTS

A description will be given below of an engine-driven generator equipped with a regeneration apparatus for an exhaust gas post-processing apparatus according to the present invention, with reference to the accompanying drawings.

Primary Configuration of Engine-Driven Generator

Figure 1:
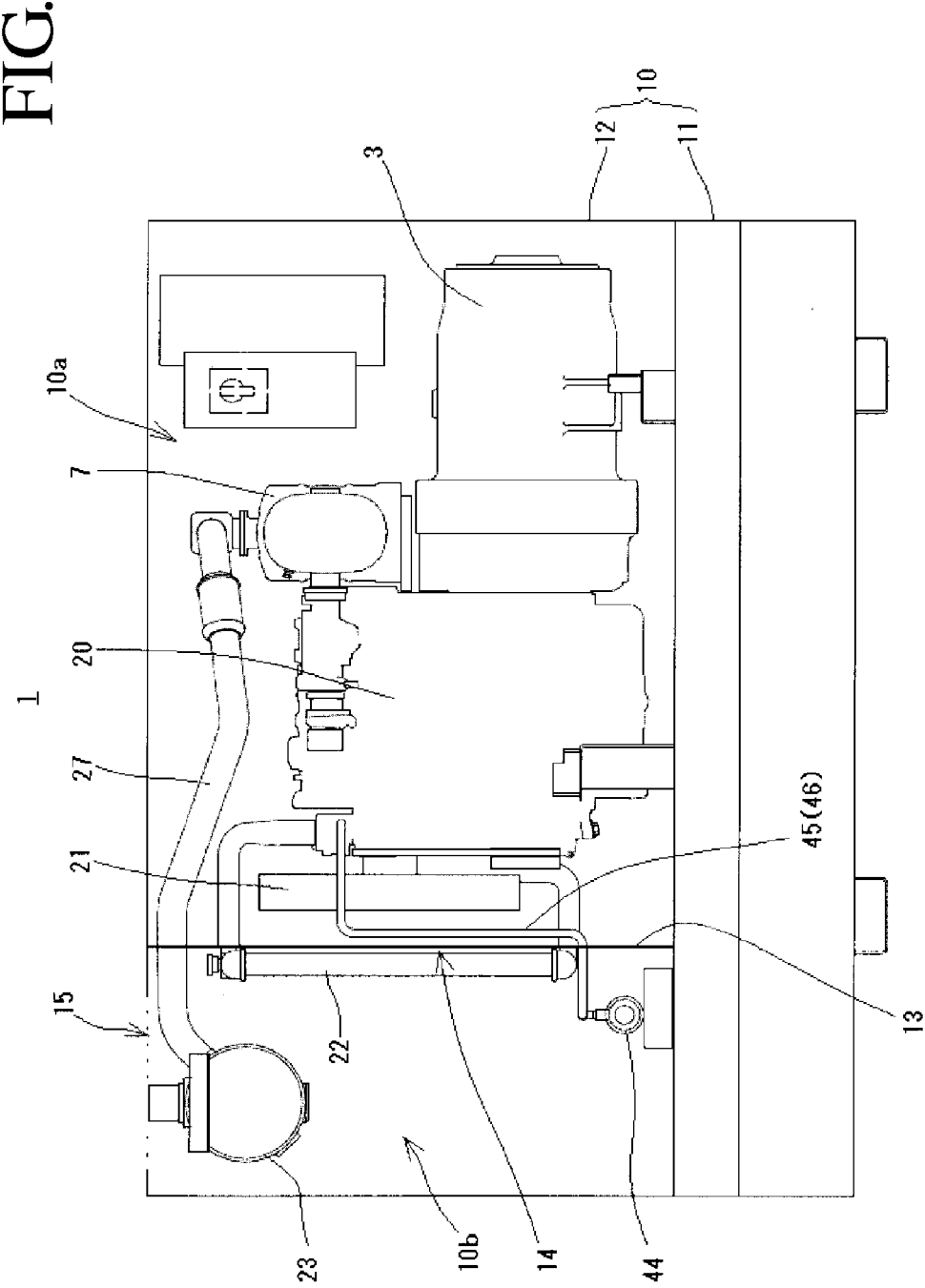
FIG. 1 schematically illustrates an overall configuration of an engine-driven generator.

FIG. 1 schematically illustrates an overall configuration of an engine-driven generator 1 equipped with an exhaust gas post-processing apparatus. Referring to the illustrated example, the engine-driven generator 1 is a package-type engine-driven generator 1 including the package 10 in which a frame 11 and a hood 12 are accommodated.

The frame 11 in the package 10 is a base on which constituent apparatuses of the engine-driven generator 1 are mounted. Mounted on this frame 11 are an engine (water-cooled diesel engine) 20, a generator body 3 driven by this engine 20, a cooling fan 21, a radiator 22, a muffler 23, an electric heater 44 that heats cooling water for the engine 20, and other constituent apparatuses of the engine-driven generator 1. The frame 11 on which these apparatuses are mounted is covered by the box-shaped hood 12 from the above to constitute the package 10.

The space inside the package 10 is separated into two rooms, or a work machine room 10a and an air exhaust room 10b, by a partition 13. The work machine room 10a accommodates the engine 20 and the generator body 3. The air exhaust room 10b accommodates the muffler 23 and the electric heater 44 that heats the cooling water for the engine 20, both of which are constituent apparatuses of the exhaust system for the engine.

Referring to the illustrated example, constituent apparatuses of the exhaust system for the engine 20 are an exhaust gas post-processing apparatus 7 connected to the exhaust gas opening in the engine 20, an exhaust gas pipe 27 connected to the exhaust gas post-processing apparatus 7, and the muffler 23 connected to the exhaust gas pipe 27. The exhaust gas post-processing apparatus 7 and the exhaust gas pipe 27 are disposed within the work machine room 10a; the muffler 23 is disposed within the air exhaust room 10b.

The layout of the constituent apparatuses in the exhaust system is not limited to the illustrated construction. Alternatively, for example both the exhaust gas post-processing apparatus 7 and the muffler 23 may be disposed within the air exhaust room 10b. However, the exhaust gas post-processing apparatus 7 is preferably disposed close to the exhaust gas opening of the engine 20, as illustrated in FIG. 1. A reason is that if the exhaust gas post-processing apparatus 7 is positioned apart from the exhaust gas opening of the engine 20, the temperature of exhaust gas introduced to the exhaust gas post-processing apparatus 7 may be decreased, and this exhaust gas decreases the DOC inlet temperature. Consequently, the engine 20 needs to run under a heavy load in order to burn PM deposited in the DOC, thus leading to, for example deterioration of fuel efficiency.

The partition 13 is provided with a communicating opening 14 via which the work machine room 10a communicates with the air exhaust room 10b. The radiator 22, which exchanges its heat with the heat of the cooling water that has cooled the engine 20, is disposed opposite the communicating opening 14. A cooling fan 21 is disposed within the work machine room 10a for generating cooling air toward this radiator 22.

The rotation of the cooling fan 21 generates the cooling air flowing from the work machine room 10a to the radiator 22. In the radiator 22, the heat of the air is exchanged with the heat of the cooling water. This air is introduced to the air exhaust room 10b and then discharged to the outside of the package 10 via an air discharge opening 15 formed above the air exhaust room 10b.

Circulating Passage of Cooling Water and Electrical Heater

The engine 20, or a water-cooled diesel engine, has a water jacket 25 formed in, for example its cylinder block as the passage for the cooling water. In addition, the radiator 22 is provided to cool the cooling water that has passed through the water jacket 25 by exchanging the heat of the cooling water with the heat of the air. The water jacket 25 communicates with the radiator 22 via, for example a pipe, thus forming the circulating passage for the cooling water.

Figure 2:
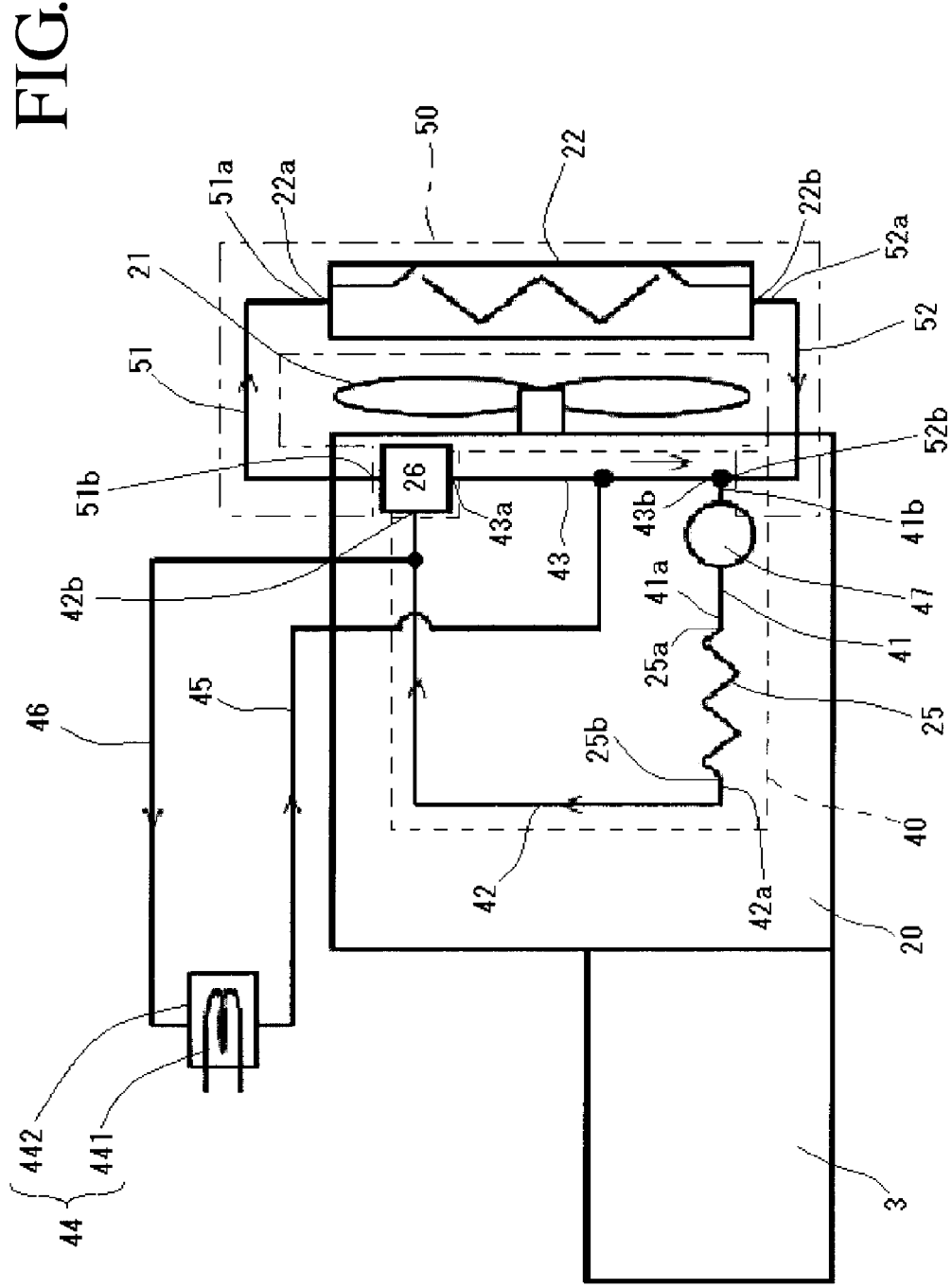
FIG. 2 illustrates a cooling water system in an engine-driven generator according to the present invention.

FIG. 2 illustrates an exemplary configuration of the circulating passage for the cooling water. As illustrated in FIG. 2, the circulating passage for the cooling water is partially formed of the water jacket 25 and includes an engine-side passage 40 and a radiator-side passage 50. In the engine-side passage 40, the cooling water for the water jacket 25 is circulated. In the radiator-side passage 50 partially formed of the radiator 22, the cooling water is introduced from the engine-side passage 40 to the radiator 22 and then returned from the radiator 22 to the engine-side passage 40.

In the illustrated example, the water jacket 25 formed in the engine-side passage 40 has an inlet 25a that communicates with one end 41a of an inlet passage 41 and an outlet 25b that communicates with one end 42a of an outlet passage 42. The outlet passage 42 has the other end 42b that communicates with one end 43a via a thermostat 26. The inlet passage 41 has the other end 41b that communicates with the other end 43b of a bypass passage 43. The inlet passage 41 is provided with a cooling water pump 47 that creates the flow of the cooling water in this passage.

The engine-side passage 40 configured above is further provided with an electric heater 44 that heats the cooling water flowing in this engine-side passage 40. In the illustrated example, the outlet passage 42 communicates with a branch passage 46; the bypass passage 43 communicates with a branch passage 45. The electric heater 44 is provided with these branch passages 45 and 46.

The electric heater 44 includes a heater body 441 and a casing 442 covering this heater body 441; the cooling water is introduced to the casing 442. The branch passages 45 and 46 are interconnected via the casing 442. When the cooling water is introduced from the outlet passage 42 to the casing 442 via the branch passage 46, the heater body 441 heats this cooling water. Then, the heated cooling water is introduced from the branch passage 45 to the bypass passage 43.

In the example of FIG. 2, the electric heater 44 is installed between the branch passage 46 communicating with the outlet passage 42 and the branch passage 45 communicating with the bypass passage 43. However, there is no limitation on a configuration of the electric heater 44. The electric heater 44 may be installed at any location where the cooling water in the engine-side passage 40 can be heated. Alternatively, the electric heater 44 may be installed in the inlet passage 41, the outlet passage 42, or the bypass passage 43, for example. In this case, the branch passages 45 and 46 do not necessarily have to be provided, and the electric heater 44 may be installed directly in the inlet passage 41, the outlet passage 42, or the bypass passage 43. More preferably, the electric heater 44 is installed in the bypass passage 43 or the inlet passage 41 so as to be able to heat the cooling water that has not been introduced to the water jacket 25.

The electricity consumed by the electric heater 44 needs to be equal to or more than "minimum generated electricity" that will be described below.

The "minimum generated electricity" needs to be determined in advance through, for example actual measurement made while the engine-driven generator 1 equipped with a regeneration apparatus according to the present invention is operating. More specifically, for example under the condition that the engine 20 runs while intake gas to the engine 20 is controlled by forced regeneration means (described later), the DOC inlet temperature which changes with electricity generated (or consumed) by the generator body 3 is measured. Thereby, the relationship between the electricity generated by the generator body 3 and the DOC inlet temperature is determined from the measurement result. On the basis of this relationship, the electricity to be generated by the generator body 3 which increases the DOC inlet temperature to a temperature at which PM deposited in the DOC burns is determined. This resulting electricity is designated as the "minimum generated electricity" described above.

A description will be given of an example of setting electricity consumed by the electric heater 44 on the basis of the measurement result in table 1. To give an example, the DOC inlet temperature which burns PM deposited in the DOC is preferably about 350° C. or more, more preferably 400° C. or more, although this temperature is dependent on the performance of the DOC.

Figure 5:
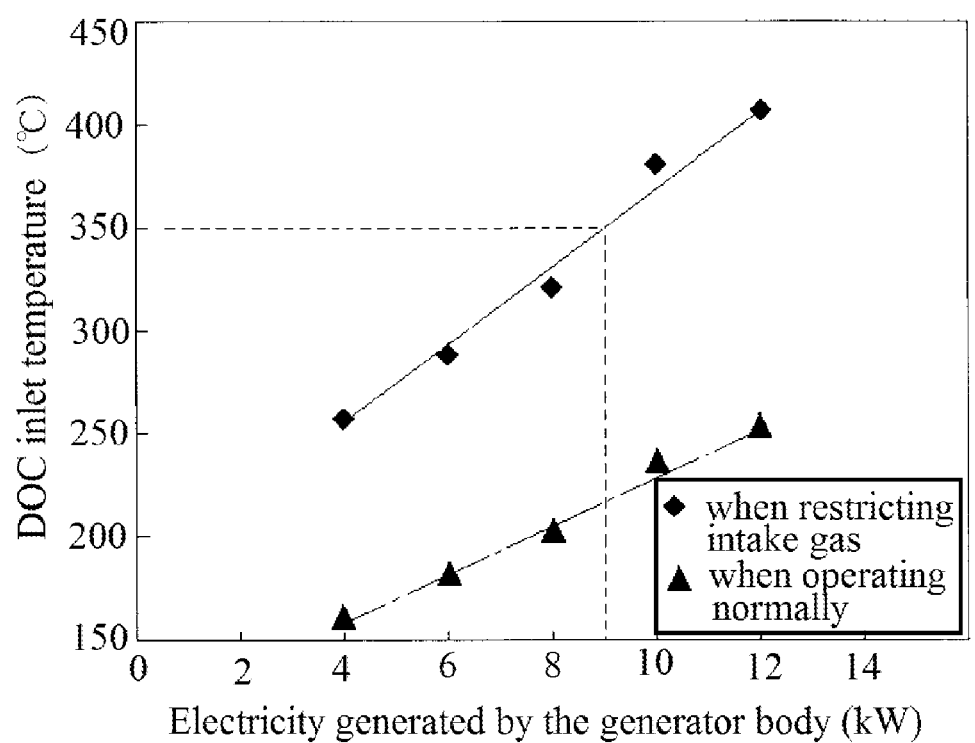
FIG. 5 is a graph showing a change in a DOC inlet temperature with respect to a change in electricity generated by the generator body.

FIG. 5 is a graph showing the measurement result in table 1. As can be seen in the graph of FIG. 5, in the engine 20 with the intake gas restricted, the DOC inlet temperature reaches 350° C. when the electricity generated by the generator body 3 is about 9 kW. For the engine-driven generator 1, the above "minimum generated electricity" is 9 kW. So, an electric heater that consumes electricity of 9 kW or more (e.g., 10 kW) should be selected as the electric heater 44 for the engine-driven generator 1.

As described above, an electric heater that consumes electricity of 9 kW or more (e.g., 10 kW) is provided, as the electric heater 44, in the engine-driven generator used for the above measurement. This electric heater 44 is connected to the generator body 3. Then, when the engine 20 runs with the intake gas to the engine 20 reduced, the DOC inlet temperature is reliably increased to 350° C. or more (377° C. in Table 1) without any additional fuel injections. Consequently, PM deposited in the DOC burns, and the activity performance of the DOC is maintained accordingly.

In the example of FIG. 2, the above-described radiator-side passage 50 is configured with: a radiator 22, an introduction passage 51 with one end 51a communicated with an introduction port 22a of the radiator 22, and an emission passage 52 with one end 52a communicated with an emission port 22b of the radiator 22. The other end 51b of the introduction passage 51 is communicated with the other end 42b of the outlet passage 42 in the engine-side passage 40 via the thermostat 26, and the other end 52b of the emission passage 52 is communicated with the other end 41b of the inlet passage 41 in the engine-side passage 40. It should be noted that the above-described thermostat 26 adjusts the amount of cooling water to be introduced to the radiator-side passage 50 in accordance with the temperature of the cooling water, and circulates the cooling water only in the engine-side passage 40 without introducing the cooling water to the radiator-side passage 50 until the temperature of the cooling water in the engine 20 reaches or exceeds a predetermined temperature (e.g., 80° C.).

Forced Regeneration

Figure 3:
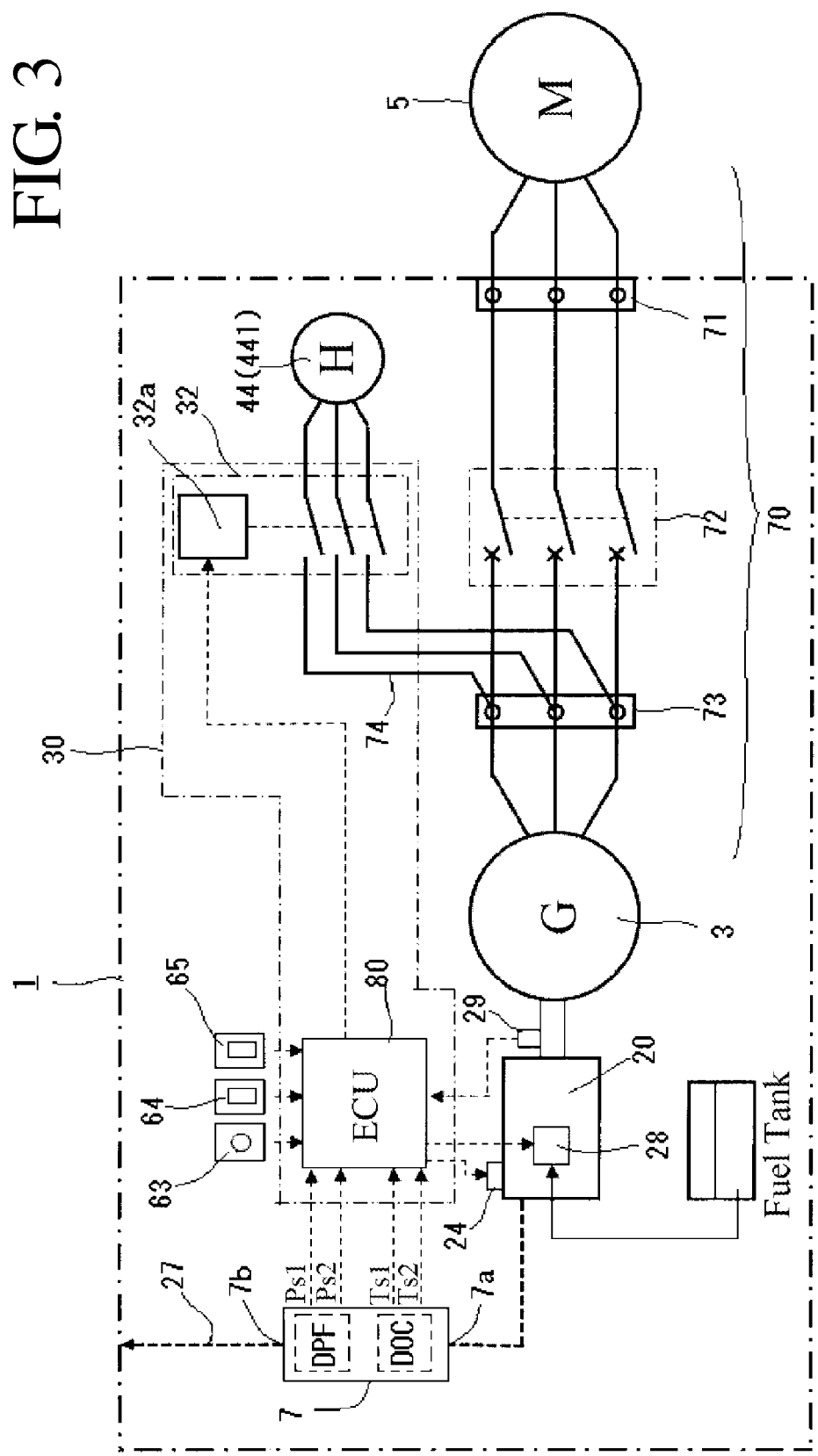
FIG. 3 is an electric circuit diagram of the engine-driven generator according to the present invention.

As illustrated in FIG. 3, the exhaust gas post-processing apparatus 7 described above acts as a so-called "continuous regeneration type exhaust gas post-processing apparatus" and has a casing with an inlet 7a and an outlet 7b. The inlet 7a is connected to the engine 20 on the exhaust gas opening side; the outlet 7b is connected to the exhaust gas pipe 27. The casing contains an oxidation catalyst (DOC) at the inlet 7a and a diesel particulate filter (DPF) at the outlet 7b. The engine-driven generator 1 according to the present invention performs forced regeneration in which intake gas to the engine 20 is restricted to increase the temperature of the exhaust gas. When at least a predetermined amount of PM is deposited with respect to the DPF of the exhaust gas post-processing apparatus 7.

In the forced regeneration, burning PM deposited on the DOC and burning PM deposited on the DPC may carried out at a time by increase the temperature of the exhaust gas to a necessary temperature only by restricting the intake gas to the engine 20 in the above manner and controlling the switching-ON/OFF of the electric heater 44 in a manner described later. In this embodiment, burning PM deposited in the DOC is carried out only by restricting the intake gas to the engine 20 and control of the switching-ON/OFF of the electric heater 44 until a predetermined time period (e.g., 10 minutes) has elapsed since the start of the forced regeneration. Following this, burning PM deposited on the DPF is carried out by additionally injecting fuel to the engine 20 in addition to said restricting the intake gas to the engine 20 and control of the switching-ON/OFF of the electric heater 44.

More specifically, first, until the predetermined time interval has elapsed since the start of the forced regeneration, the forced regeneration of the DOC is carry out without additionally injecting fuel, which may affect the regeneration of the DOC, thereby reliably recovering the activity performance of the DOC. Then, to start the additional fuel injection, thereby effectively removing PM deposited in the DPF. In this way, the exhaust gas post-processing apparatus 7 is regenerated efficiently.

In this embodiment, an engine control unit (ECU) 80 controls the operation of the engine 20 driving the generator body 3 and implements fuel injection control means 85 for controlling a fuel injecting apparatus 28 installed in the engine 20. Also, the ECU 80 implements a forced regeneration control unit 81 that controls the operations of units to be used for forced regeneration during the forced regeneration (see FIG. 4).

The above fuel injection control means 85 controls, for example the amount and timing of fuel injected to the combustion chamber in the engine 20 and the additional injection by changing a fuel injection amount signal to be output to the fuel injecting apparatus 28 in the engine 20.

Figure 8:
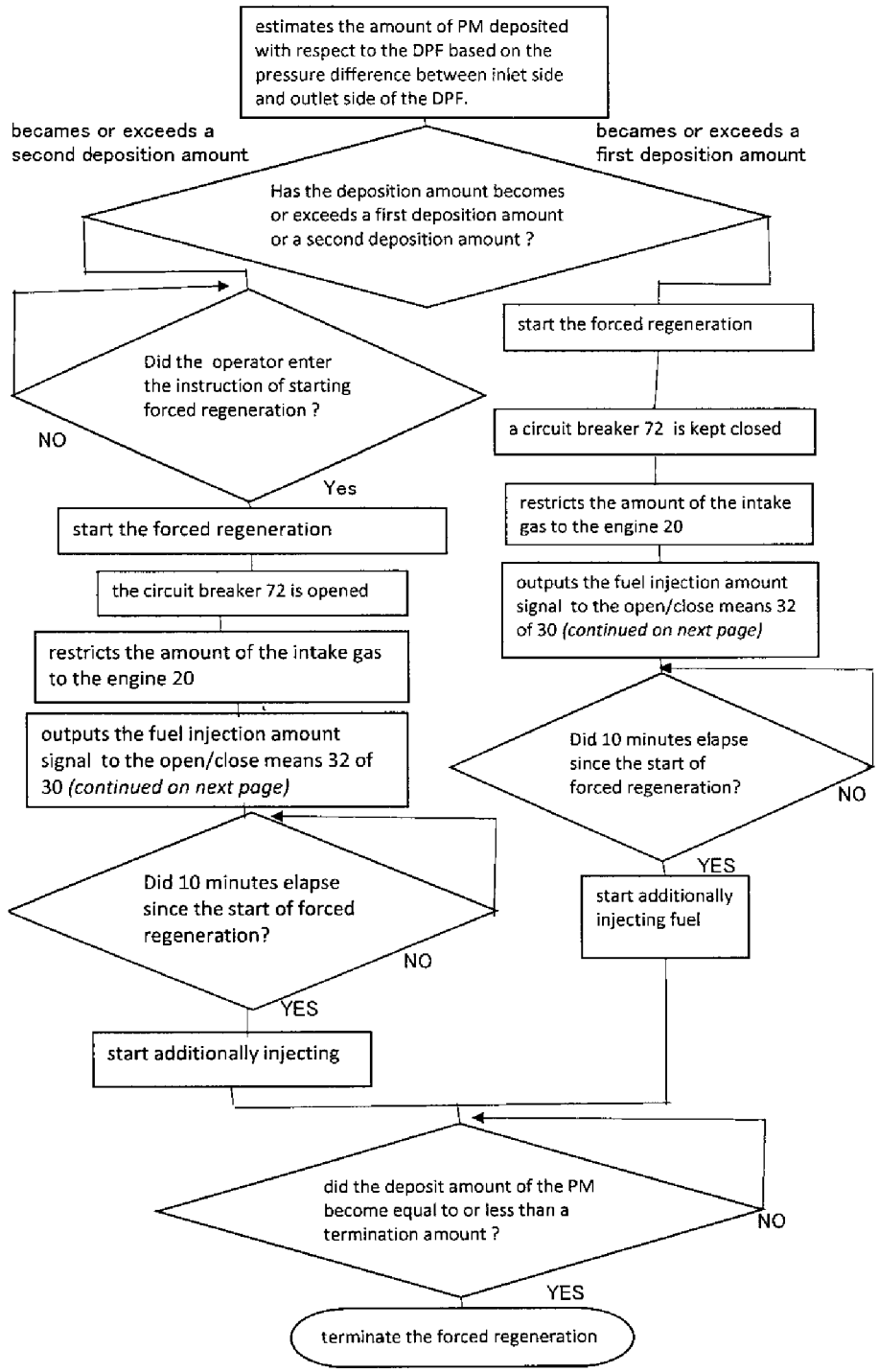
FIG. 8 is a flow chart of a forced regeneration control unit.

The basic control of the fuel injection control means 85 is performed depending on a variation in a load on the engine 20 which involves a variation in the electricity consumed or generated by the generator body 3. Further, the fuel injection control means 85 controls the fuel injecting apparatus 28 to change the amount of fuel injected to the engine 20 so that a rotational speed of the generator body 3 detected by rotational speed detecting means 29 becomes equal to a rotational speed at which electricity of a predetermined frequency (50 or 60 Hz) set by frequency setting means 65 is generated. However, when the forced regeneration control unit 81 performs forced regeneration, the fuel injection control means 85 controls the fuel injecting apparatus 28 to additionally inject fuel in addition to performing the above basic control (see FIG. 8).

The above forced regeneration control unit 81 includes deposition state determining means 82 and forced regeneration execution means (83 and 84). The deposition state determining means 82 determines the amount of PM deposited with respect to the DPF within the exhaust gas post-processing apparatus 7. The forced regeneration execution means (83 and 84) performs the forced regeneration by controlling individual units on the basis of the determination result from the deposition state determining means 82. In this embodiment, two forced regeneration are performed; one is a variable load type forced regeneration that is to be performed when the electricity is supplied to an output terminal block 71, and the other is a constant load type forced regeneration when the electricity supplied to the output terminal block 71 is interrupted. For this reason, the variable load type forced regeneration execution means 83 and the constant load type forced regeneration execution means 84 are provided as the forced regeneration execution means.

The deposition state determining means 82 estimates the amount of PM deposited with respect to the DPF on the basis of a difference between pressures detected by pressure detecting means Ps1 and pressure detecting means Ps2. The pressure detecting means Ps2 is disposed on the inlet side of the DPF in the exhaust gas post-processing apparatus 7; the pressure detecting means Ps1 is disposed on the outlet side of the DPF therein. Alternatively, the deposition state determining means 82 may estimate the amount of PM deposited with respect to the DPF by using equations based on a relationship of predetermined detection results entered in the ECU 80 in advance. Examples of the detection results include the amount of fuel injected to the engine 20, and operational states of the engine 20 such as a rotational speed. These results may be detected by sensors or other measurement devices disposed at predetermined locations. When the amount of PM detected by either one of the above methods reaches a predetermined amount, the deposition state determining means 82 outputs a determination result.

In this embodiment, the two types of forced regeneration, that is, the variable load type and constant load type forced regeneration, are performed as the forced regeneration. Further, different amounts of PM deposited with respect to the DPF are set for each of the two types of forced regeneration as their start conditions. Therefore, the deposition state determining means 82 determines whether the amount of PM becomes or exceeds a first deposition amount that is the start condition for the variable load type forced regeneration and whether the deposition amount of PM becomes or exceeds a second deposition amount that is the start condition for the constant load type forced regeneration.

If it is necessary, as the termination conditions for the variable load type forced regeneration and the constant load type forced regeneration, to determine that the amount of PM deposited with respect to the DPF becomes equal to or less than the predetermined regeneration termination amount, the correspondence between the deposition amount which can be used as a standard for the respective determination and the pressure difference between before and after the DPF is stored in storage means or the like in the ECU 80 so as to determine the decrease to the regeneration termination amount or less.

Figure 4:
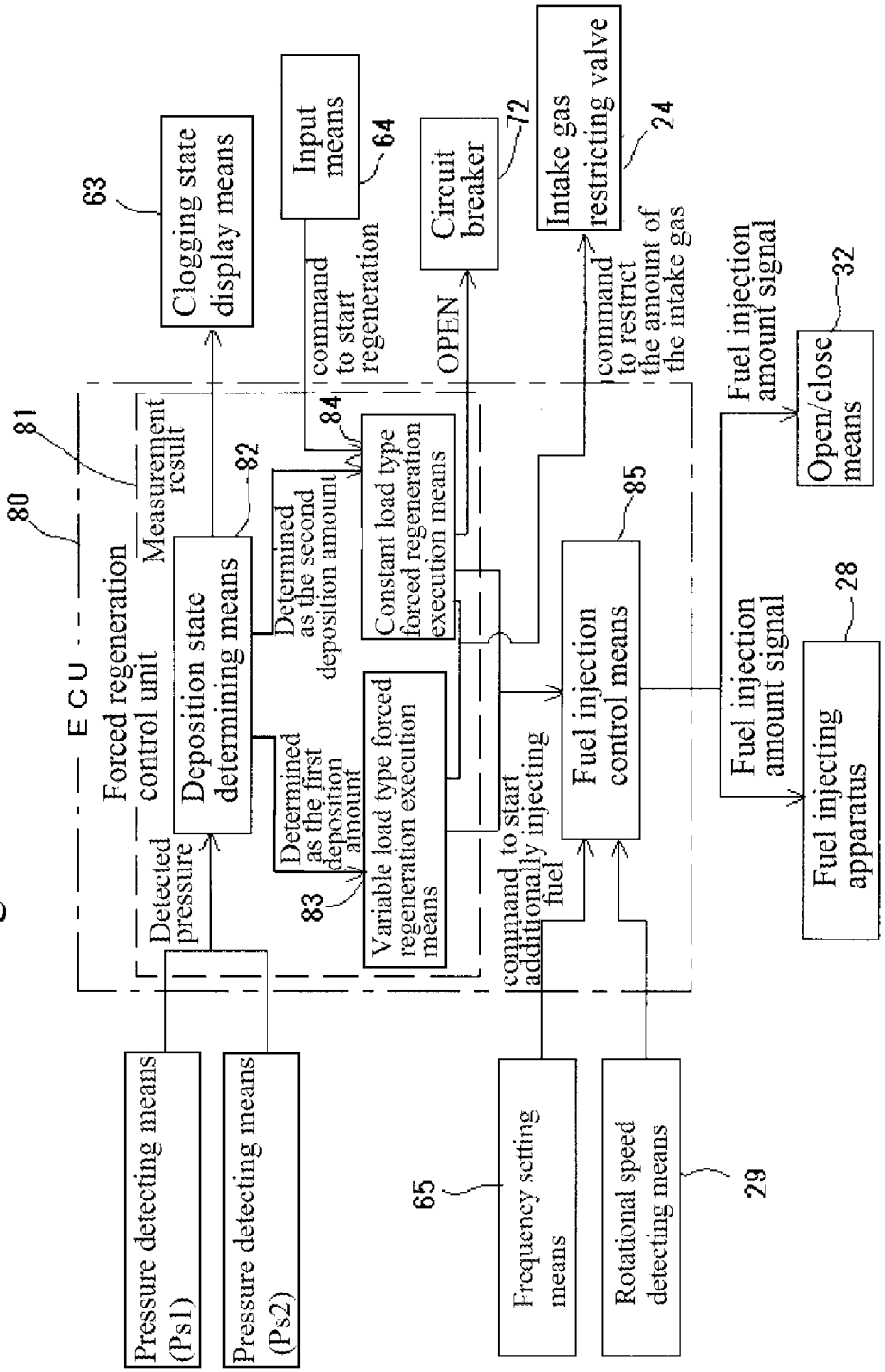
FIG. 4 is a functional block diagram of forced regeneration means.

The deposition state determining means 82 transmits the determination result to the forced regeneration execution means 83 and 84. If clogging state display means 63 for indicating clogging of the DPF is provided as illustrated in FIGS. 3 and 4, the deposition state determining means 82 may also output the determination result to the clogging state display means 63, causing the clogging state display means 63 to indicate, for example an alarm about clogging of the DPF or deposition of PM in the DPF. The above clogging state display means 63 is implemented using a warning light, a liquid crystal screen, or an alarm unit, for example.

The above variable load type forced regeneration execution means 83 is activated when the deposition state determining means 82 determines that the amount of PM deposited with respect to the DPF becomes equal to or more than the first deposition amount. Then, the variable load type forced regeneration execution means 83 outputs a control signal to an electronically controlled intake gas restricting valve 24 provided in the intake gas system of the engine 20 (e.g., intake manifold, not illustrated). In response to the control signal, the intake gas restricting valve 24 restricts the amount of the intake gas to the engine 20. Also, the variable load type forced regeneration execution means 83 outputs a control signal for controlling the operation of a switching device 32 to the switching device 32 provided in a heater power supply circuit 74 (described later) that acts as a power supply circuit for the electric heater 44. This enables the electric heater 44 to switch ON or OFF depending on a load on the engine 20. It should be noted that in the illustrated example, the fuel injection amount signal is also used as the control signal.

After a predetermined time period (e.g., 10 minutes) has elapsed since the start of the forced regeneration, the variable load type forced regeneration execution means 83 causes the fuel injection control means 85 to start additionally injecting fuel as described above.

While the variable load type forced regeneration execution means 83 is performing the forced regeneration, a circuit breaker 72 (see FIG. 3) provided in a main supply circuit 70 (described later) is kept closed, allowing the electricity to be continuously supplied to an electrical device 5 to which the output terminal block 71 is connected.

In this embodiment, the above constant load type forced regeneration execution means 84 is activated when the deposition state determining means 82 determines that the amount of PM deposited with respect to the DPF becomes equal to or more than the second deposition amount and when an operator enters an instruction of starting the constant load type forced regeneration by operating input means 64.

After activated, the constant load type forced regeneration execution means 84 outputs a control signal to the circuit breaker 72 (see FIG. 3) provided in the main supply circuit 70 (described later). In response to this control signal, the circuit breaker 72 is opened, stopping supplying the electricity to the electrical device 5 to which the output terminal block 71 is connected. Then, the constant load type forced regeneration execution means 84 also outputs a control signal to the electronically controlled intake gas restricting valve 24 provided in the intake gas system of the engine 20 (e.g., intake manifold, not illustrated) to cause the intake gas restricting valve 24 to restrict the amount of the intake gas to the engine 20. Moreover, the constant load type forced regeneration execution means 84 causes the fuel injection control means 85 to control the injection amount of fuel so that the rotational speed of the engine 20 becomes a predetermined regeneration rotational speed. Then, the constant load type forced regeneration execution means 84 outputs a control signal to the switching device 32 (described later), switching ON the electric heater 44. The fuel injection amount signal is also used as the control signal in the illustrated example.

After a predetermined time period (e.g., 10 minutes) has elapsed since the start of the forced regeneration, the constant load type forced regeneration execution means 84 causes the fuel injection control means 85 to start additionally injecting fuel as described above.

In the example of FIG. 4, the circuit breaker 72 employs an electronically controlled type, and this circuit breaker 72 is opened in response to the control signal from the constant load type forced regeneration execution means 84 while the constant load type forced regeneration is being performed. However, the circuit breaker 72 may be opened or closed by an operator's hand.

If the circuit breaker 72 is opened or closed by an operator's hand, detecting means for detecting whether the circuit breaker 72 is in the open or closed position may be provided. In this case, the constant load type forced regeneration execution means 84 may be activated when the instruction of starting the constant load type forced regeneration is received through the input means 64 and when the circuit breaker 72 is in the opened position. If the circuit breaker 72 is in the closed position, the constant load type forced regeneration execution means 84 does not have to perform the constant load type forced regeneration even when receiving the instruction of starting the constant load type forced regeneration through the input means 64.

When the deposition state determining means 82 determines that the amount of PM deposited with respect to the DPF becomes equal to or less than a predetermined termination amount, the variable load type forced regeneration execution means 83 and the constant load type forced regeneration execution means 84 may terminate the forced regeneration. Alternatively, the variable load type forced regeneration execution means 83 and the constant load type forced regeneration execution means 84 may terminate the forced regeneration after a predetermined time period has elapsed since the start of the forced regeneration or when the following two conditions are satisfied: a predetermined time period has elapsed since the start of the forced regeneration, and the amount of PM deposited with respect to the DPF is determined to become equal to or less than a predetermined termination amount.

Heater Controller

The above electric heater 44 is provided in the circulating passage in which the cooling water for the engine 20 flows. In addition, the electric heater 44 is incorporated into an electric circuit provided with the generator body 3 that serves as a power supply and thus supplied with the electricity generated by the generator body 3. The electric circuit is further provided with a heater controller 30 for controlling the open/close of a circuit between the generator body 3 and the electric heater. Thereby, the heater controller 30 can control the switching-ON/OFF of the electric heater 44.

FIG. 3 illustrates an exemplary configuration of an electric circuit in an engine-driven generator which incorporates the electric heater 44 and the heater controller 30.

The generator body 3, implemented using a three-phase AC generator, generates AC electricity and supplies this electricity to the electrical device 5 outside the engine-driven generator 1 via the output terminal block 71 provided in, for example the hood of the engine-driven generator 1. To supply the electricity from the generator body 3 to the outside via the output terminal block 71, the main supply circuit 70 provided with the circuit breaker 72 connects the generator body 3 to the output terminal block 71.

To supply the electricity from the generator body 3 to the heater body 441 in the electric heater 44, the heater power supply circuit 74 that branches off from the main supply circuit 70 is provided. This heater power supply circuit 74 supplies the electricity from the generator body 3 to the electric heater 44 that heats the cooling water for the engine 20.

In the illustrated embodiment, a relay terminal block 73 connected to the wiring terminals of the generator body 3 is provided in the main supply circuit 70. At this relay terminal block 73, the heater power supply circuit 74 branches off from the main supply circuit 70.

The electric heater 44 connected to the generator body 3 in the above manner switches ON or OFF by opening/closing the heater power supply circuit 74 with the switching device 32 implemented using an electromagnetic contactor, for example. The operation of the switching device 32 is controlled by a signal from the ECU 80, accordingly, when the engine 20 is in a predetermined light load running state, the electric heater 44 switches ON, whereas when the engine 20 runs under a predetermined necessary load or more, the electric heater 44 switches OFF (see FIG. 9).

In this embodiment the heater controller 30 for controlling the switching-ON/OFF of the electric heater 44 is configured with both the switching device 32 which receives a signal from the ECU 80.

In the illustrated embodiment shown in FIG. 3, to achieve the control of the switching-ON/OFF of the electric heater in the forced regeneration described above, the ECU 80 is used as the control signal output means for outputting to the above-mentioned switching device 32. Although the ECU 80 outputs the fuel injection amount signal to the fuel injecting apparatus 28, the ECU 80 also outputting the fuel injection amount signal as the signal indicating a variation in the load on the engine 20 to the switching device 32.

A larger amount of fuel is injected to the engine 20 running under a heavier load. In other words, a smaller amount of fuel is injected to the engine 20 running under a lighter load. In light of this fact, the intensity of the fuel injection amount signal that the ECU 80 outputs to the fuel injecting apparatus 28 in the engine 20 changes depending on the load on the engine 20.

An operating condition for the switching device 32 is set in order to control the electric heater 44. Specifically, when the engine 20 is in a predetermined light load running state, the switching device 32 is closed in response to the fuel injection amount signal, switching ON the electric heater 44. When the engine 20 runs under a predetermined necessary load or more, the switching device 32 is opened in response to the fuel injection amount signal, switching OFF the electric heater 44.

In the example described above, the ECU 80 output the fuel injection amount signal as the signal indicating a variation in the load on the engine 20 to the switching device 32. However, a signal output to the switching device 32 is not limited to the fuel injection amount signal. Alternatively, for example the ECU 80 may calculate the load ratio of the engine 20 and output, to the switching device 32, a signal having intensity depending on the calculated load ratio, thereby controlling the operation of the switching device.

The engine 20 running under a heavier load outputs higher-temperature exhaust gas. In other words, the engine 20 running under a lighter load outputs lower-temperature exhaust gas. In light of this fact, temperature detecting means for sensing the temperature of the exhaust gas from the engine 20 or temperature sensing means for sensing the temperature inside the exhaust gas post-processing apparatus 7 may be used as the signal output means for outputting the signal to the switching device 32. In this case, the temperature detecting means or the temperature sensing means may output a sensing signal to the switching device 32 as the control signal indicating a variation in the load on the engine 20.

As the generator body 3 generates a larger amount of electricity, a heavier load is placed on the engine 20. In other words, as the generator body 3 generates a smaller amount of electricity, a lighter load is placed on the engine 20. In light of this fact, for example a current transformer 31 may be provided in the main supply circuit 70, and the secondary current of this current transformer 31 may be output to the switching device 32 as the signal indicating a variation in the load on the engine 20.

One of the output signal from the ECU 80, the sensing signal from the temperature sensing means, and the secondary current of the current transformer 31 may be used for control of the switching device 32. However, for example the above signals may be combined and entered in a controller 32a provided in the switching device 32. Further, the controller 32a may determine the running state of the engine 20 through a calculating process using the received signals and control the switching-ON/OFF of this electric heater 44 on the basis of the determination result. It should be noted that various modifications to the illustrated configuration are possible.

As described above, the heater controller 30 controls the switching-ON/OFF of the electric heater in accordance with the load on the engine 20.

In the forced regeneration by the variable load type forced regeneration execution means 83 with the circuit breaker 72 closed, i.e., with the electricity supplied to the electrical device 5 connected to the output terminal block 71, the switching-ON/OFF of the electric heater 44 is controlled in accordance with the variation in the load on the engine 20 due to the fluctuation in the electricity consumed by the electrical device 5 connected to the output terminal block 71. In contrast, in the forced regeneration by the constant load type forced regeneration execution means 84 with the circuit breaker 72 opened i.e., with the supply of the electricity to the electrical device 5 connected to the output terminal block 71 interrupted, the engine 20 is in a light load running state (a no-load running state). Therefore, during the forced regeneration by the constant load type forced regeneration execution means 84, the switching device 32 is always kept closed and the electric heater 44 is thus maintained in an on-state.

Consequently, the generator body 3 generates electricity corresponding to electricity consumed by the electric heater 44, and a constant load corresponding to the generated electricity is placed on the engine 20. This operation stabilizes the temperature of the exhaust gas from the engine 20, making it possible to perform forced regeneration while the DOC in the exhaust gas post-processing apparatus 7 is maintained at a constant temperature.

Function or the Like

A detailed description will be given of operation of the engine-driven generator 1 equipped with the regeneration apparatus configured above for the exhaust gas post-processing apparatus 7 according to the present invention.

In the following description, the electric heater 44 consumes electricity of 10 kW and running of the engine 20 under a light load refers to running of the engine 20 when the generator body 3 generates 10 kW or below. Furthermore, the predetermined necessary load described above refers to a load placed on the engine 20 when the generator body 3 generates electricity of 25 kW (the sum of 15 kW which is electricity consumed by the electrical device 5, and 10 kW which is electricity consumed by the electric heater 44).

i) Variable Load Type Forced Regeneration

The deposition state determining means 82 receives pressure detection signals from the pressure detecting means Ps2 for detecting the pressure of the inlet of the DPF in the exhaust gas post-processing apparatus 7 and the pressure detecting means Ps1 for detecting the pressure of the outlet side of the DPF therein. Then, the deposition state determining means 82 estimates the amount of PM deposited with respect to the DPF on the basis of the difference between the pressures detected by the pressure detecting means Ps1 and the pressure detecting means Ps2.

If the deposition state determining means 82 determines that the amount of PM estimated is equal to or more than a predetermined first deposition amount, the clogging state display means 63 indicates that the DPF has been clogged on the basis of the determination result, in which case a variable load type forced regeneration is needed. Thus, the variable load type forced regeneration execution means 83 is activated and outputs a control signal to the intake gas restricting valve 24, transiting to operation in which intake gas to the engine 20 is restricted by a predetermined amount. Simultaneously, the variable load type forced regeneration execution means 83 outputs a fuel injection amount signal, which would be output to the fuel injecting apparatus 28, to the switching device 32 for opening or closing the heater power supply circuit 74.

After the engine 20 has run for a predetermined time period with the intake gas restricted, the variable load type forced regeneration execution means 83 causes the fuel injection control means 85 to start additionally injecting fuel in addition to a normal injection of the fuel.

While the variable load type forced regeneration execution means 83 is performing the forced regeneration, the circuit breaker 72 in the main supply circuit 70 is kept closed, maintaining the supply of electricity to the output terminal block 71.

Prior to the start of the forced regeneration, the switching device 32 is opened and thus the electric heater is OFF-state. When the ECU 80 enters a fuel injection amount signal in the switching device 32 in response to the activation of the variable load type forced regeneration execution means 83, the switching device 32 opens/closes the heater power supply circuit 74, switching OFF or ON the electric heater 44, depending on the intensity of the fuel injection amount signal from the ECU 80.

If the fuel injection amount signal received by the switching device 32 at the start of the forced regeneration indicates that the engine 20 runs under a light load and the generator body 3 generates electricity less than 10 kW, the switching device 32 closes the heater power supply circuit 74, switching ON the electric heater 44.

Suppose that the electricity consumed by the electrical device 5 varies during the forced regeneration while the electric heater 44 is kept ON and the electricity generated by the generator body 3 increases to more than 25 kW, furthermore a load on the engine 20 becomes equal to or more than the predetermined necessary load, the switching device 32 opens the heater power supply circuit 74 instantly on the basis of the fuel injection amount signal indicating a variation in the load on the engine 20, thereby switching OFF the electric heater 44.

Suppose that a variation in the consumed electricity during the forced regeneration causes the electricity generated by the generator body 3 to decrease to 10 kW or less while the electric heater 44 is kept OFF. In response, the engine 20 transits to a light load running state and continues this operation over a predetermined time period (e.g., 3 minutes). Then, the switching device 32 closes the heater power supply circuit 74, switching ON the electric heater 44.

As described above, the instant switching-OFF of the electric heater 44 makes possible to prevent electricity from being excessively consumed by the amount consumed by the electric heater 44, even when an electrical device 5 that consumes electricity corresponding to the rated output of the engine-driven generator 1 is connected to the output terminal block 71. In contrast, there is no problem in switching ON the electric heater 44 with a predetermined time lag. Also, setting such a time lag can avoid a short-time switching repetition of the electric heater even when an electrical device 5 in which the current temporarily varies upon start-up, such as an electrical device 5 equipped with a star-delta starting type of motor, is connected.

ii) Constant Load Type Forced Regeneration

When the deposition state determining means 82 determines that at least a predetermined second deposition amount of PM which is greater than the foregoing first deposition amount is deposited with respect to the DPF during the variable load type forced regeneration described above due to that PM deposited in the DPF cannot be removed sufficiently and the deposition of PM further proceeds or the like, the deposition state determining means 82 subsequently outputs a determination result to the clogging state display means 63, causing the clogging state display means 63 to indicate that the DPF has been clogged in a predetermined manner.

In response to the above determination result from the deposition state determining means 82, the constant load type forced regeneration execution means 84 enters a waiting state until an operator enters an instruction of starting the constant load type forced regeneration by operating the input means 64 implemented using a button switch, for example.

The operator confirms that the DPF is in a predetermined clogging state (the amount of PM is equal to or more than the second deposition amount) from the indication of the clogging state display means 63. Then, when the engine-driven generator 1 gets ready to operate the constant load type forced regeneration, such as when operation using the engine-driven generator 1 is completed, the operator enters an instruction of starting the constant load type forced regeneration by operating the input means 64.

The constant load type forced regeneration execution means 84 that has been in the waiting state is activated in response to the starting instruction entered by the operator, and starts performing the constant load type forced regeneration.

The constant load type forced regeneration execution means 84 that has been activated outputs an open signal to the circuit breaker 72 in the main supply circuit 70. In response to this open signal, the main supply circuit 70 is opened. The supply of electricity to the output terminal block 71 is thereby interrupted in the course of the execution of the constant load type forced regeneration.

The constant load type forced regeneration execution means 84 outputs a control signal to the intake gas restricting valve 24 so as to transits to operation in which intake gas to the engine 20 is restricted by a predetermined amount. In addition, the constant load type forced regeneration execution means 84 causes the fuel injection control means 85 to control the amount of fuel injected so that the rotational speed of the engine becomes a predetermined regeneration rotational speed. Moreover, the constant load type forced regeneration execution means 84 outputs a fuel injection amount signal to the switching device 32 as a control signal, thereby the switching device 32 opens or closes the heater power supply circuit 74 according to the intensity of the fuel injection amount signal.

After the engine 20 has operated over a predetermined time period (e.g., 10 minutes) with the intake gas restricted, the constant load type forced regeneration execution means 84 causes the fuel injection control means 85 to start additionally injecting fuel in addition to controlling injections of the fuel in accordance with the above regeneration rotation speed.

As described above, while the constant load type forced regeneration execution means 84 is performing the forced regeneration, no electricity is supplied to the output terminal block 71. At the start of the forced regeneration, the electric heater 44 switches OFF and the generator body 3 thus generates electricity of 0 kW. Consequently, the engine 20 is in a predetermined light load running state. When receiving a fuel injection amount signal indicating this operational state of the engine 20, the switching device 32 closes the heater power supply circuit 74, switching ON the electric heater 44.

In response to the switching-ON of the electric heater 44, the generator body 3 starts outputting electricity corresponding to electricity to be consumed by the electric heater 44. When the electric heater 44 switches ON, the electricity generated by the generator body 3 becomes 10 kW and therefore does not reach 25 kW at which the electric heater 44 switches OFF, because the electricity consumed by the electric heater 44 is set to 10 kW.

Consequently, the electric heater is kept on while the constant load type forced regeneration execution means 84 is performing the forced regeneration so as to perform the forced regeneration with the exhaust gas from the engine 20, or the interior of the exhaust gas post-processing apparatus 7 maintained at a stable temperature.

Other Embodiments

FIG. 6 illustrates a configuration provided with voltage switching means 75 that allows connection patterns of a winding in the generator body 3 provided in the engine-driven generator 1 to be switched so as to vary an output voltage of the generator body 3.

In the exemplary configuration of FIG. 3, the heater power supply circuit 74 branches off from the main circuit at the relay terminal block 73 in the main supply circuit 70. However, in the embodiment illustrated in FIG. 6, the voltage switching means 75 for switching wiring states of armature windings (u1, u2, v1, v2, w1, and w2) in the generator body 3 between three-phase 200 V and single-phase 200 V supply connection patterns, for example, is provided. This voltage switching means 75 is connected to the main supply circuit 70 and the heater power supply circuit 74; the main supply circuit 70 supplies electricity to an electrical device 5 connected to an output terminal block 71, and the heater power supply circuit 74 supplies electricity generated by the generator body 3 to an electric heater 44.

The above voltage switching means 75 may be configured using a cam-operated switch having a plurality of com contacts, for example. The voltage switching means 75 in this case is configured to be able to select the outputs of the three-phase 200 V and the single-phase 200 V to be applied to the main supply circuit 70 connected to a main supply circuit terminal block 76 by changing switching positions.

In this embodiment, changing wiring states of the armature windings in the generator body can also simultaneously switch wiring of the heater power supply circuit 74 connected to a heater power supply circuit terminal block 77.

Figure 7A:
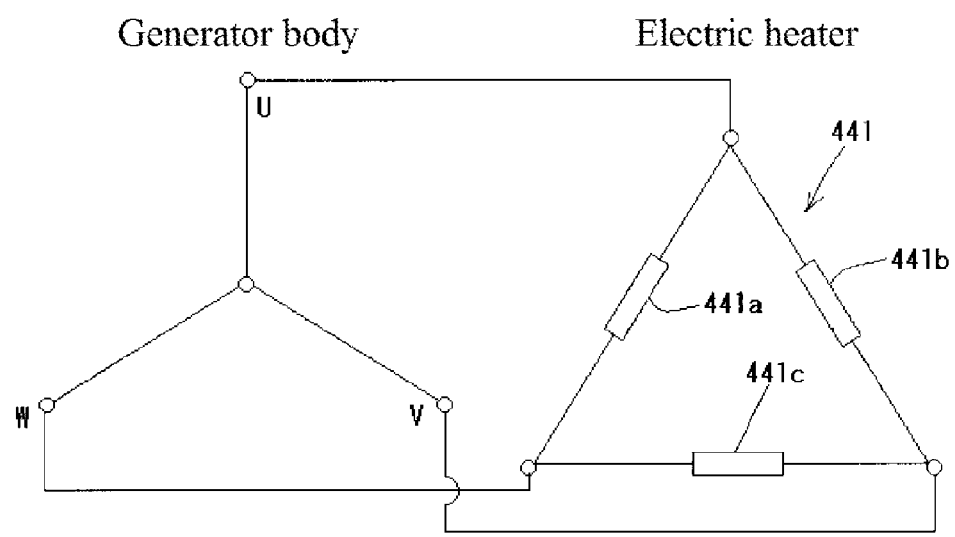
FIG. 7A illustrates the variation of wiring in a generator body and wiring in an electric heater, in which is a three-phase wiring.
Figure 7B:
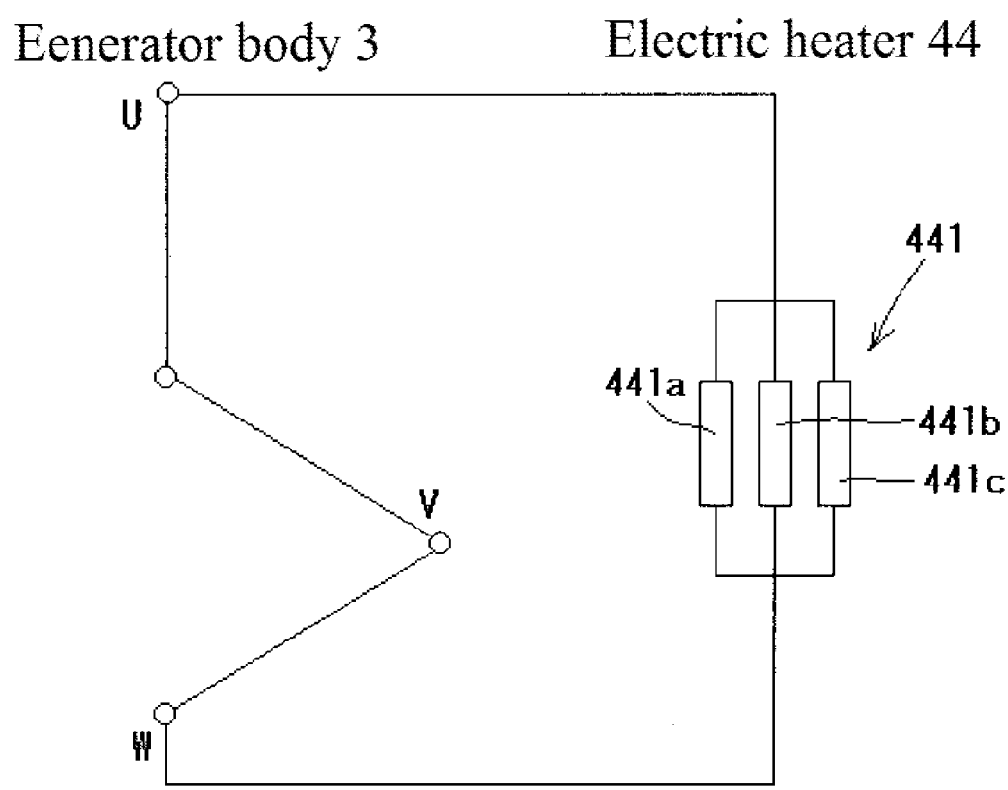
FIG. 7B illustrates the variation of wiring in a generator body and wiring in an electric heater, in which is a single-phase wiring.

In this embodiment, as illustrated in FIGS. 7A and 7B, for example, a heater body 441 in the electric heater 44 includes a combination of three heating elements 441a, 441b, and 441c. When the generator body 3 applies the three-phase 200 V wiring, the electric heater 44 is so configured that the heating elements 441a, 441b, and 441c in the heater body 441 are interconnected in a delta fashion as illustrated in FIG. 7A, and the peaks of the delta-shaped wiring are connected individually to the phases U, V, and W of an armature winding in the generator body 3. When the generator body 3 applies the single-phase 200 V wiring as illustrated in FIG. 7B, the electric heater 44 is automatically switched to such a wiring manner that the heating elements 441a, 441b, and 441c in the heater body 441 are interconnected in parallel and are connected to both the phases U and W of the generator body 3 wired in a single-phase. This enables a voltage of 200 V to be always applied to the heater body 441 of the electric heater 44.

It should be noted that, in the apparatus configuration illustrated in FIG. 6, the wiring of the armature windings in the generator body 3 may be configured to be switchable between three-phase 400 V and three-phase 200 V supply wirings. In this case, configuration should also be made to enable a constant voltage, such as 200 V, to be always applied to the heater power supply circuit 74 before and after the switching of the connection patterns.

Thus the broadest claims that follow are not directed to a machine that is configure in a specific way. Instead, said broadest claims are intended to protect the heart or essence of this breakthrough invention. This invention is clearly new and useful. Moreover, it was not obvious to those of ordinary skill in the art at the time it was made, in view of the related art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

DESCRIPTIONS OF REFERENCE NUMERALS

1 Engine-driven generator
3 Generator body
5 Electrical device
7 Continuous regeneration type exhaust gas post-processing apparatus
7a Inlet (of the continuous regeneration type exhaust gas post-processing apparatus 7)
7b Outlet (of the continuous regeneration type exhaust gas post-processing apparatus 7)
10 Package
10a Work machine room
10b Air exhaust room
11 Frame
12 Hood
13 Partition
14 Communicating opening
15 Air discharge opening
20 Engine
21 Cooling fan
22 Radiator
22a Introduction port (of the radiator 22)
22b Emission port (of the radiator 22)
23 Muffler
24 Intake gas restricting valve
25 Water jacket
25a Input (of the water jacket 25)
25b Outlet (of the water jacket 25)
26 Thermostat
27 Exhaust gas pipe
28 Fuel injecting apparatus
29 Rotational speed detecting means
30 Heater controller
31 Current transformer
32 Switching device
32a Controller
40 Engine-side passage
41 Inlet passage
41a One end (of an inlet passage 41)
41b The other end (of the inlet passage 41)
42 Outlet passage
42a One end (of the outlet passage 42)
42b Other end (of the outlet passage 42)
43 Bypass passage
43a One end (of the bypass passage 43)
43b The other end (of a bypass passage 43)
44 Electric heater
441 Heater body
441a,441b,441c Heating elements (of the heater body 441)
442 Casing
45, 46 Branch passage 46
47 Cooling water pump
50 Radiator-side passage
51 Introduction passage
51b One end (of the introduction passage 51)
51b The other end (of the introduction passage 51)
52 Emission passage
52a One end (of emission passage 52)
52b The other end (of the emission passage 52)
63 Clogging state display means
64 Input means
65 Frequency setting means
70 Main supply circuit
71 Output terminal block
72 Circuit breaker
73 Relay terminal block
74 Heater power supply circuit
75 Voltage switching means
76 Main supply circuit terminal block
77 Heater power supply circuit terminal block
80 Engine control unit (ECU)
81 Forced regeneration control unit
82 Deposition state determining means
83 Variable load type forced regeneration execution means
84 Constant load type forced regeneration execution means
85 Fuel injection control means
Ps1, Ps2 Pressure detecting means

What is claimed is:

1. A method of regenerating an exhaust gas post-processing apparatus in an engine-driven generator, the engine-driven generator comprising an engine that is a diesel engine, a generator body driven by the engine, and an output terminal block connected to the generator body via a main supply circuit, and configured to be able to supply electricity generated by the generator body to an electrical device connected to the output terminal block, the method comprising:

providing a continuous regeneration type exhaust gas post-processing apparatus that is installed in an exhaust gas path of the engine and comprises an oxidation catalyst and a diesel particulate filter; and performing forced regeneration of the exhaust gas post-processing apparatus by restricting intake gas to the engine to increase a temperature of exhaust gas from the engine when the deposition amount of particulate matter with respect to the diesel particulate filter becomes a predetermined deposition amount;

determining electricity to be generated by the generator body, in which an oxidation catalyst inlet temperature becomes a burning temperature of the particulate matter deposited with respect to the oxidation catalyst or more during running of the engine with the intake gas restricted as minimum generated electricity in advance, and setting electricity consumed by an electric heater actuated with the electricity generated by the generator body to the minimum generated electricity or more; and monitoring the running state of the engine while the forced regeneration is being performed, and switching ON the electric heater, when the engine is in a predetermined light load running state and switching OFF the electric heater when the engine is under a predetermined necessary load or more.

2. The method of regenerating an exhaust gas post-processing apparatus in an engine-driven generator according to claim 1, comprising:

additionally injecting fuel to the engine after a predetermined time elapses from a start of the forced regeneration until the completion of the forced regeneration.

3. The method of regenerating an exhaust gas post-processing apparatus in an engine-driven generator according to claim 1, comprising:

providing a circuit breaker for opening or closing the main supply circuit, performing the forced regeneration with the circuit breaker closed.

4. The method of regenerating an exhaust gas post-processing apparatus in an engine-driven generator according to claim 1, comprising:
providing a circuit breaker for opening or closing the main supply circuit,
performing the forced regeneration with the circuit breaker opened.

5. The method of regenerating an exhaust gas post-processing apparatus in an engine-driven generator according to claim 1, comprising:
providing a circuit breaker for opening or closing the main supply circuit,
performing the forced regeneration with the circuit breaker closed when the deposition amount of particulate matter with respect to the diesel particulate filter becomes a predetermined first deposition amount, and
performing the forced regeneration with the circuit breaker opened when the deposition amount of particulate matter with respect to the diesel particulate filter becomes a predetermined second deposition amount that exceeds the first deposition amount.

6. The method of regenerating an exhaust gas post-processing apparatus in an engine-driven generator according to claim 1, wherein
the monitoring of the running state of the engine is based on one of or a combination of two or more of: a fuel injection amount signal to be output from an engine control unit (ECU), a temperature of the exhaust gas from the engine, a temperature inside the exhaust gas post-processing apparatus, and a current value flowing through the main supply circuit.

7. The method of regenerating an exhaust gas post-processing apparatus in an engine-driven generator according to claim 1, comprising:
switching ON the electric heater when the engine keeps the light load running state over a predetermined time period.

8. The method of regenerating an exhaust gas post-processing apparatus in an engine-driven generator according to claim 1, comprising:
switching OFF the electric heater immediately after a load placed on the engine becomes or exceeds the necessary load.

9. A regeneration apparatus for an exhaust gas post-processing apparatus in an engine-driven generator, the engine-driven generator comprising an engine that is a diesel engine, a generator body driven by the engine, and an output terminal block connected to the generator body via a main supply circuit, and configured to be able to supply electricity generated by the generator body to an electrical device connected to the output terminal block, wherein the regeneration apparatus comprises:
a continuous regeneration type exhaust gas post-processing apparatus that is installed in an exhaust gas path of the engine and comprises an oxidation catalyst and a diesel particulate filter;
forced regeneration control unit, which
determines the deposition amount of the particulate matter of the diesel particulate filter based on the pressure difference between the inlet and the outlet of the diesel particulate filter detected by pressure sensors,
outputs a control signal to an electronically controlled intake gas restricting valve provided in the intake gas system of the engine to restrict intake gas to the engine when the deposition amount of particulate matter with respect to the diesel particulate filter becomes a predetermined deposition amount, and
performs forced regeneration of the exhaust gas post-processing apparatus by increasing a temperature of exhaust gas from the engine as a result of the restricting intake gas; and
an electric heater actuated with the electricity generated by the generator body,
wherein electricity to be generated by the generator body, in which an oxidation catalyst inlet temperature becomes a burning temperature of the particulate matter deposited with respect to the oxidation catalyst or more during operation of the engine with the intake gas restricted, is determined in advance as minimum generated electricity, and electricity consumed by the electric heater is set to the minimum generated electricity or more, and
a heater controller which monitors the running state of the engine while the forced regeneration control unit is performing the forced regeneration, and switching ON the electric heater when the engine is in a predetermined light load running state and switching OFF the electric heater when the engine is under a predetermined necessary load or more.

10. The regeneration apparatus for an exhaust gas post-processing apparatus in an engine-driven generator according to claim 9, wherein
the forced regeneration control unit commands additional fuel injection after a predetermined time elapses from a start of the forced regeneration until the completion of the forced regeneration.

11. The regeneration apparatus for an exhaust gas post-processing apparatus in an engine-driven generator according to claim 9, comprising a circuit breaker for opening or closing the main supply circuit,
wherein the forced regeneration control unit performs the forced regeneration with the circuit breaker closed.

12. The regeneration apparatus for an exhaust gas post-processing apparatus in an engine-driven generator according to claim 9, comprising a circuit breaker for opening or closing the main supply circuit,
wherein the forced regeneration control unit performs the forced regeneration with the circuit breaker opened.

13. The regeneration apparatus for an exhaust gas post-processing apparatus in an engine-driven generator according to claim 9, comprising a circuit breaker for opening or closing the main supply circuit,
wherein the forced regeneration control unit performs:
the forced regeneration with the circuit breaker closed when the deposition amount of particulate matter with respect to the diesel particulate filter becomes a predetermined first deposition amount; and
the forced regeneration with the circuit breaker opened when the deposition amount of particulate matter with respect to the diesel particulate filter becomes a predetermined second deposition amount that exceeds the first deposition amount.

14. The regeneration apparatus for an exhaust gas post-processing apparatus in an engine-driven generator according to claim 9, wherein
the heater controller comprises:
switching device which operates to open or close a heater power supply circuit that connects the generator body to the electric heater.

15. The regeneration apparatus for an exhaust gas post-processing apparatus in an engine-driven generator according to claim 14, wherein the heater controller monitors the running state of the engine based on one of or a combination of two or more of: a fuel injection amount signal from an engine control unit (ECU) for the engine, a temperature of exhaust gas from the engine or a temperature inside the exhaust gas post-processing apparatus, and a secondary current of a current transformer mounted in the main supply circuit.

16. The regeneration apparatus for an exhaust gas post-processing apparatus in an engine-driven generator according to claim 15, wherein
the switching device comprises a controller for determining a load on the engine on the basis of the one or more of the fuel injection amount signal, the temperature of exhaust gas or the temperature inside the exhaust gas post-processing apparatus, and the secondary current of the current transformer and controlling open or close operation.

17. The regeneration apparatus for an exhaust gas post-processing apparatus in an engine-driven generator according to claim 15, wherein
the heater controller switches ON the electric heater when the engine keeps the light load running state over a predetermined time period.

18. The regeneration apparatus for an exhaust gas post-processing apparatus in an engine-driven generator according to claim 15, wherein
the heater controller switches OFF the electric heater immediately after a load placed on the engine becomes or exceeds the necessary load.

19. The regeneration apparatus for an exhaust gas post-processing apparatus in an engine-driven generator according to claim 9, wherein
the heater controller switches ON the electric heater when the engine keeps the light load running state over a predetermined time period.

20. The regeneration apparatus for an exhaust gas post-processing apparatus in an engine-driven generator according to claim 9, wherein
the heater controller switches OFF the electric heater immediately after a load placed on the engine becomes or exceeds the necessary load.

* * * * *